United States Patent [19]

Cohen

[11] Patent Number: 5,609,303

[45] Date of Patent: *Mar. 11, 1997

[54] REGULATED FLOW RESTRICTOR DEVICE PARTICULARLY USEFUL AS A DRIP IRRIGATION EMITTER

[76] Inventor: Amir Cohen, Yuvalim, 20 142 Doar Na Gush Segev, Israel

[*] Notice: The term of this patent shall not extend beyond the expiration date of Pat. No. 5,400,973.

[21] Appl. No.: 348,852

[22] Filed: Nov. 28, 1994

Related U.S. Application Data

[63] Continuation of Ser. No. 99,509, Jul. 30, 1993, Pat. No. 5,400,973.

[30] Foreign Application Priority Data

Jun. 20, 1994 [IL] Israel ............................... 110062
Jul. 15, 1994 [IL] Israel ............................... 110337

[51] Int. Cl.⁶ .................................................. B05B 15/00
[52] U.S. Cl. .................................. 239/542; 239/547
[58] Field of Search ................................ 239/542, 547, 239/562, 566, 567, 463, 464; 138/42, 44, 45

[56] References Cited

U.S. PATENT DOCUMENTS 3,998,427 12/1976 Bentley ........................... 239/542 X Primary Examiner—Andres Kashnikow
Assistant Examiner—Lisa Ann Douglas
Attorney, Agent, or Firm—Benjamin J. Barish

[57] ABSTRACT

A regulated flow restrictor device particularly useful as a drip irrigation emitter includes a housing having a a flow-restrictor passageway formed with baffles defining clearances with the passageway walls, which clearances, by the displacement of a deformable elastomeric membrane, regulate the fluid flow through the passageway in response to variations in the pressure of the fluid. The clearances are of increasing height from one end of the passageway towards the other end such that the clearances are sequentially closed with increasing pressure at the housing inlet to maintain a substantially uniform flow through the housing outlet despite variations in the inlet pressure.

23 Claims, 21 Drawing Sheets

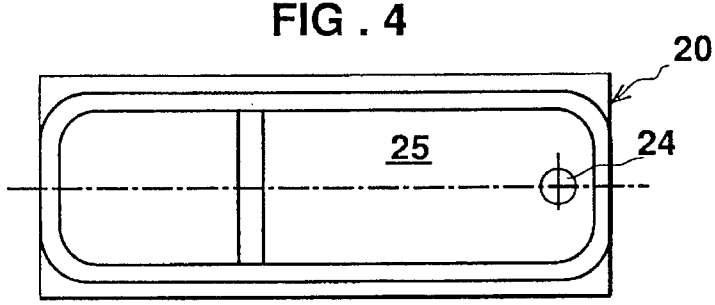
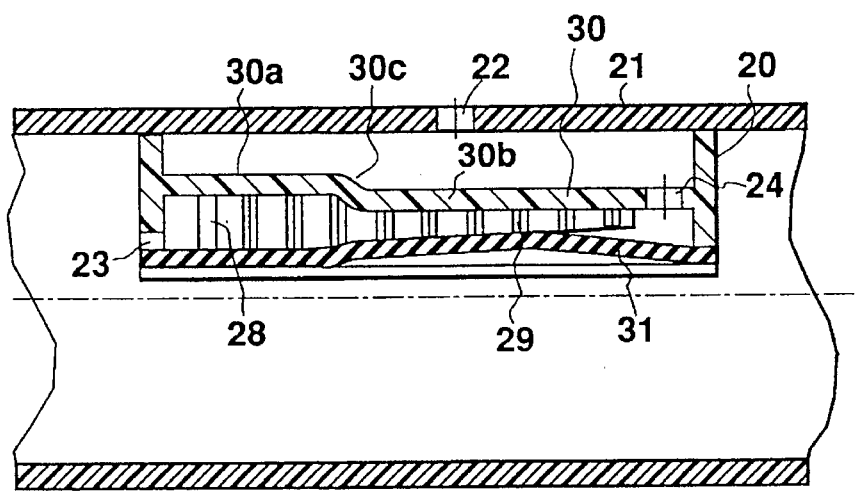
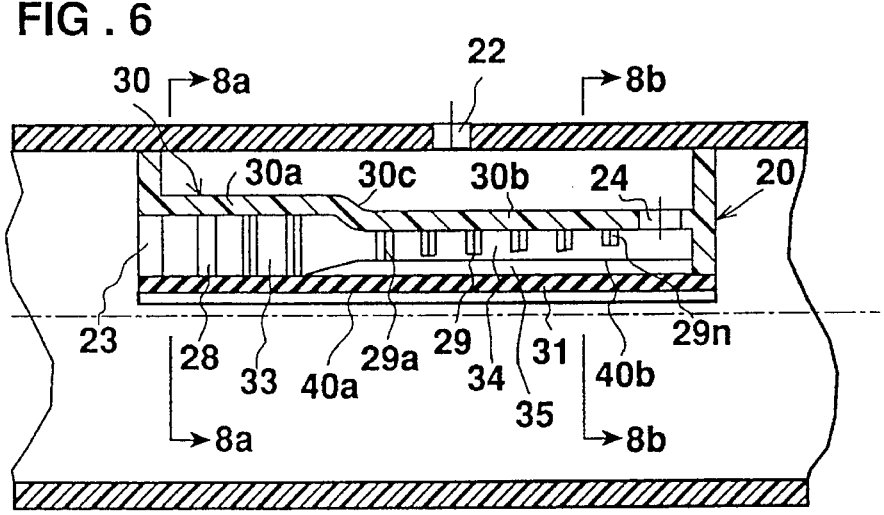

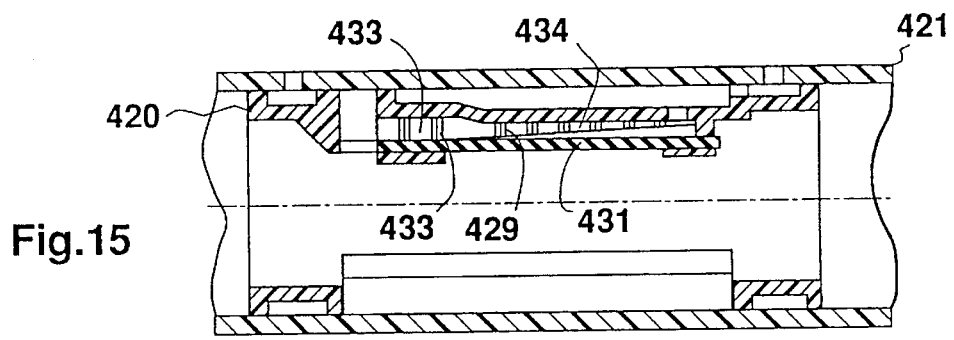
Fig.15
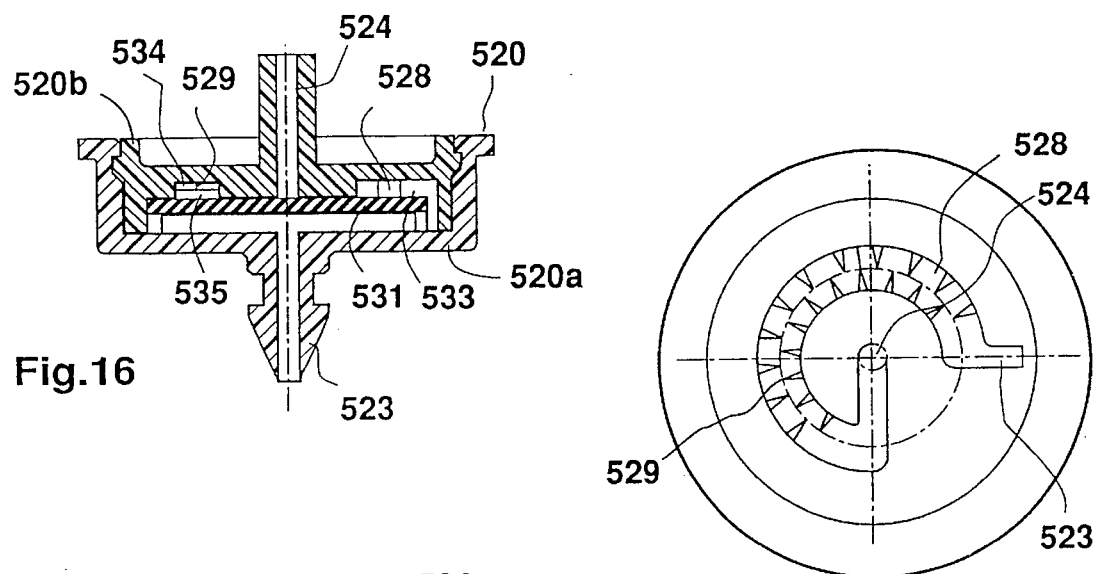
Fig.16
Fig.17
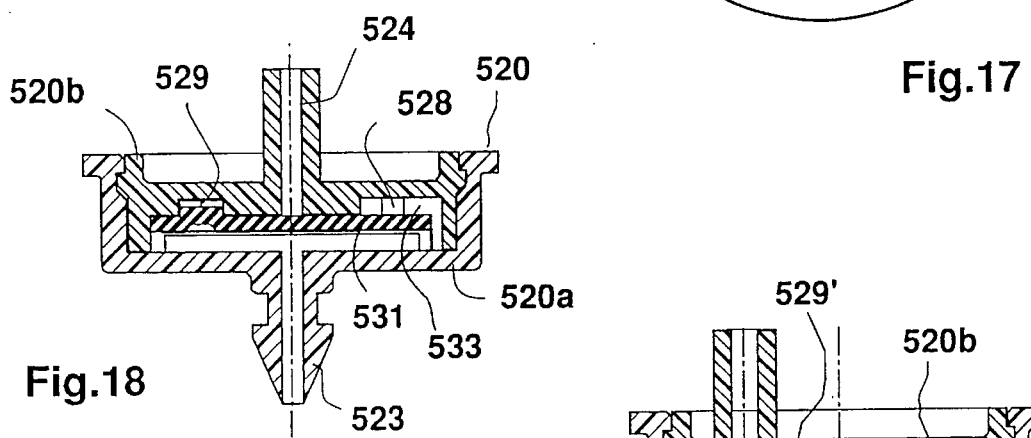
Fig.18
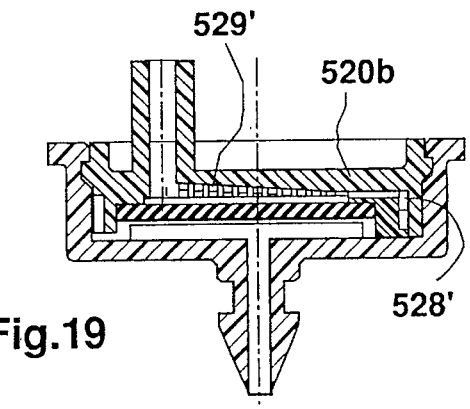
Fig.19

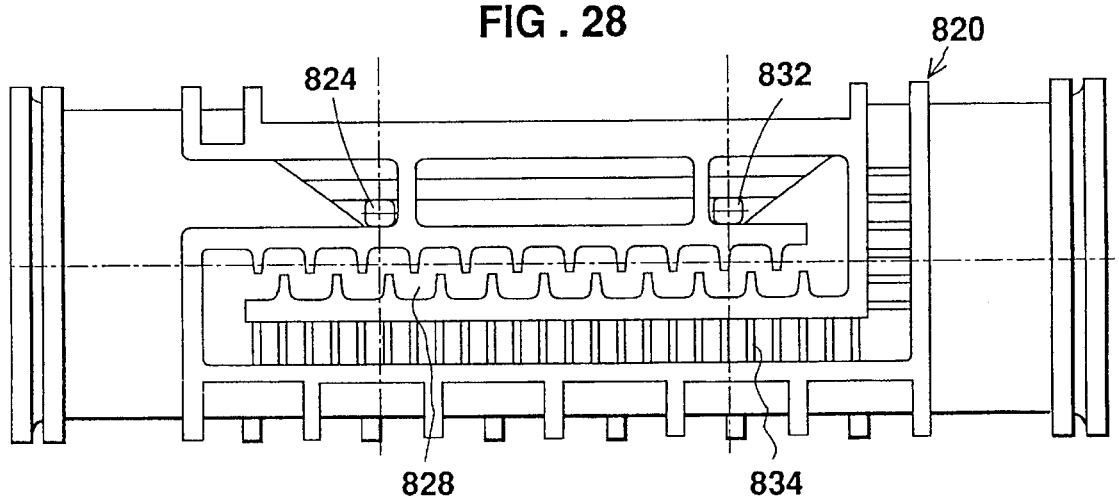
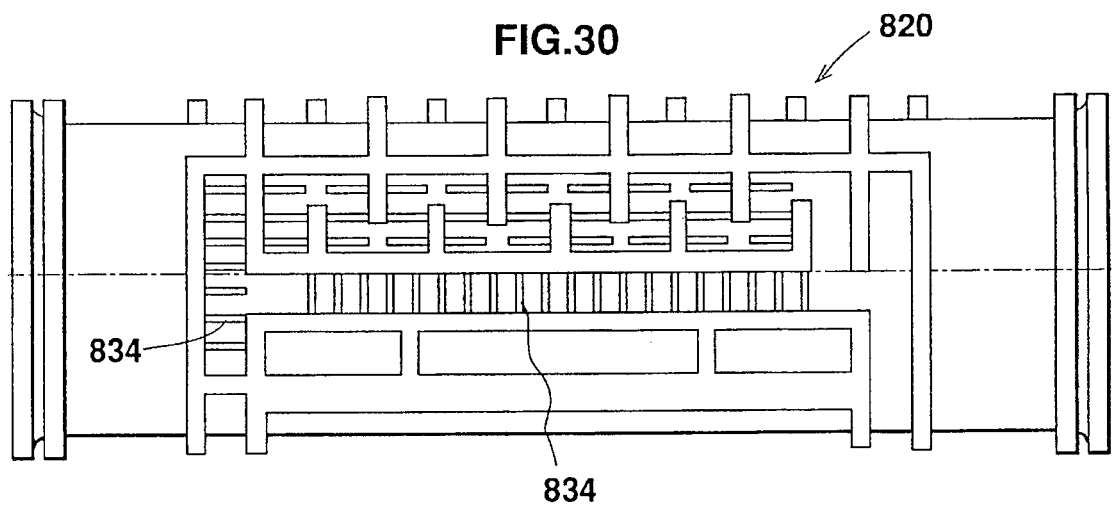

FIG. 41
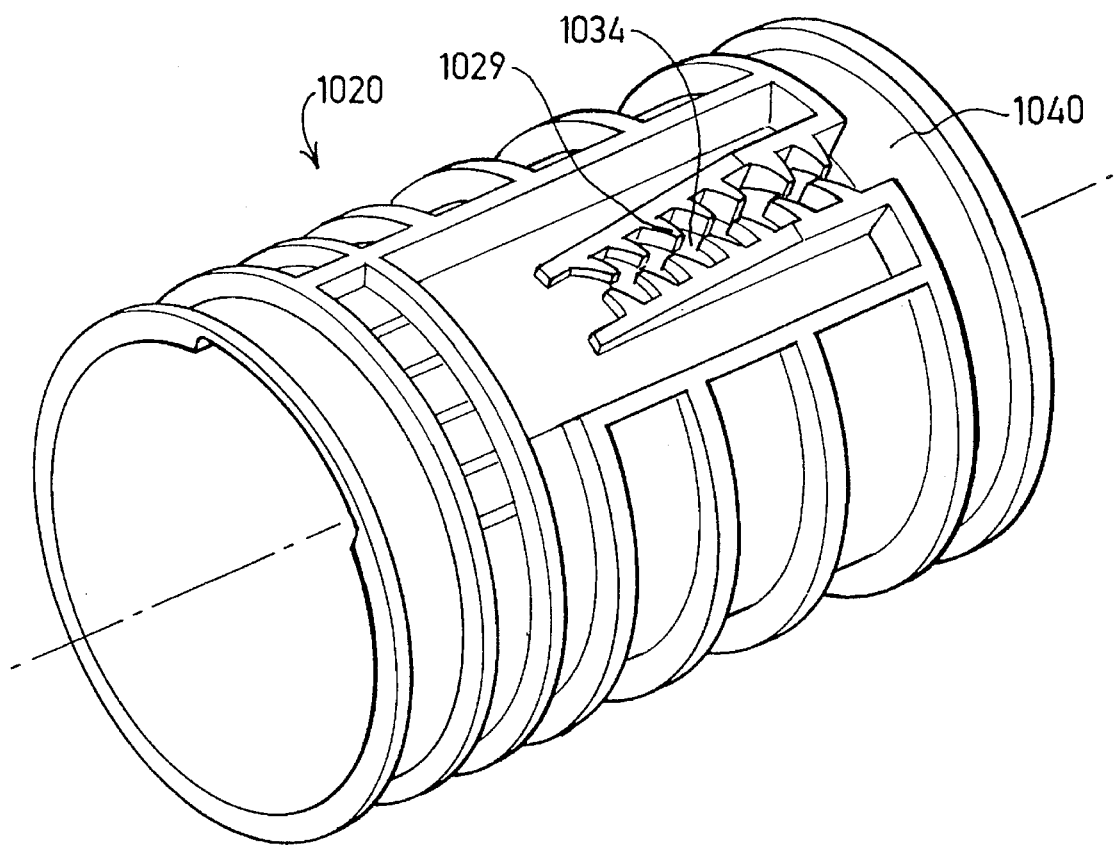
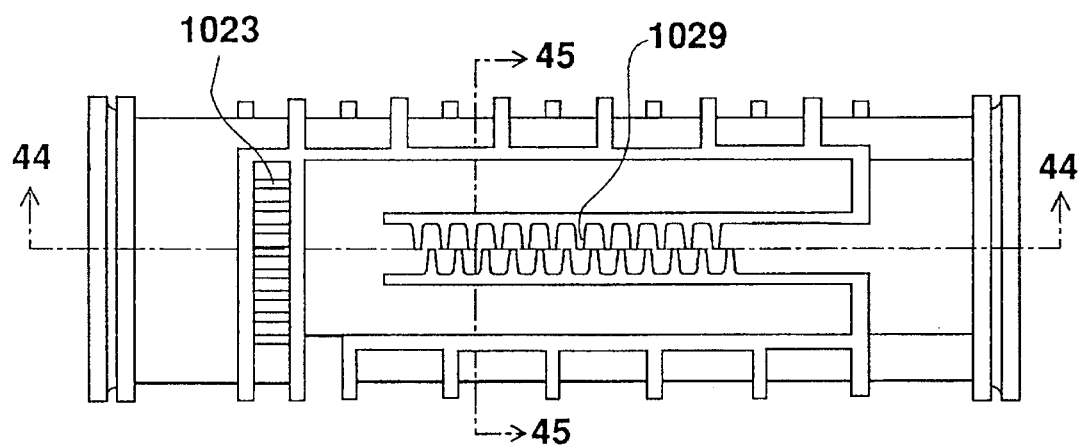
FIG. 42

5,609,303

REGULATED FLOW RESTRICTOR DEVICE PARTICULARLY USEFUL AS A DRIP IRRIGATION EMITTER

RELATED APPLICATION

The present application is a continuation-in-part of my U.S. application Ser. No. 08/099,509 filed Jul. 30, 1993, now U.S. Pat. No. 5,400,973.

FIELD AND BACKGROUND OF THE INVENTION

The present invention relates to a regulated flow restrictor device. The invention is particularly useful for drip irrigation emitters, and is therefore described below with respect to this application, but it will be appreciated that the invention could be used in other applications, such as flow-regulators for water sprinklers, medical infusion sets, fluid heating and cooling systems, and the like.

Drip irrigation systems have come into widespread use for irrigating plants since they supply a minimum of water directly to the root region of the plants. Regulated emitters have also come into widespread use since they produce a fairly uniform output despite variations in the inlet pressure, and thereby enable drip irrigation lines to be of relatively long lengths and to be used over uneven terrain.

Many techniques have been developed for regulating emitters. Some involve varying the cross-section of a labyrinth in response to changes in the inlet pressure; whereas others involve varying the cross-section of a control chamber or of an outlet port in response to changes in the inlet pressure. Another proposed technique, as described in Eckstein U.S. Pat. No. 5,111,996, varies the effective length of a labyrinth in response to changes in the outlet pressure.

In addition, there are many applications in agriculture, medicine and other fields, wherein it is desirable to regulate the flow of a fluid so as to maintain a relatively constant rate despite variations in the fluid pressure, but also to permit the flow rate to be conveniently changed to a new rate and to be maintained at the new rate despite variations in the fluid pressure. For example, in the agricultural field it is frequently desirable to set a predetermined flow rate for an irrigation dripper or water sprinkler at an early stage of a crop to be irrigated, and to increase the flow rate at later stages; in the medical field, it is frequently desirable to change the flow rate of a medical infusion set according to the particular circumstances. However, in the known devices now in use, a change in the flow rate generally also significantly affects the regulating performance of the flow control device in the new flow rate.

My above-cited application Ser. No. 08/099,509 describes a regulated flow restrictor device particularly useful as a drip irrigation emitter, comprising a housing having an inlet opening connectible to a source of pressurized fluid, an outlet opening, and a passageway including first and second opposed walls connecting the inlet opening to the outlet opening. One of the walls is displaceable towards and away from the other wall. The device further includes a plurality of baffles extending transversely of, and longitudinally spaced between, the first and second walls to define a flow-restrictor imposing a resistance to the flow of the fluid through the passageway. The baffles define clearances with the passageway walls, which clearances, by the displacement of the displaceable wall, vary the resistance of the flow of the fluid through the passageway in response to variations in the pressure of the pressurized fluid.

An important feature in the device of that application is that the clearances are of increasing height in the direction from one of the openings towards the other of the openings such that the clearances are sequentially closed with increasing pressure of the pressurized fluid to maintain a substantially uniform flow to and through the housing outlet opening despite variations in the pressure of the pressurized fluid.

As described in that application, the clearances defined by the baffles are controlled in response to variations in the inlet pressure, to thereby provide continuous and substantially uniform regulation of the outlet flow in response to variations in the inlet pressure. Such a regulated flow restrictor device may be provided with relatively large passageways, thereby reducing the sensitivity of the device to clogging. Further, since all the baffles are subjected to the flow even when the inlet pressure is relatively low, as occurring at the start and finish of an irrigation operation, the novel construction is inherently capable of self-flushing itself during irrigation and particularly at the start and end of an irrigation operation.

In the examples of the devices described in that patent application, the clearances are of increasing height from the housing inlet towards the housing outlet.

OBJECTS AND BRIEF SUMMARY OF THE PRESENT INVENTION

An object of the present invention is to provide a novel structure for a regulated flow restrictor device, and particularly for a drip irrigation emitter, which has a number of important advantages as will be described more particularly below.

Another object of the present invention is to provide a fluid control device which conveniently permits presetting different flow rates without significantly affecting the regulating performance of the flow control device to maintain each new preset rate despite variations in the fluid pressure.

According to one aspect of the present invention, there is provided a fluid flow control device, comprising: a housing including an inlet, an outlet, and a flow control passageway connecting the inlet to the outlet; the flow control passageway including a plurality of baffles and a deformable elastomeric membrane defining therewith a labyrinth passageway having a plurality of clearances with respect to the baffles which clearances are sequentially closed by the deformation of the membrane with increasing pressure at the housing inlet to maintain a substantially uniform flow to and through the housing outlet in response to variations in the pressure of the water at the housing inlet; the clearances being being sequentially closed in the direction from the housing outlet towards the housing inlet with increasing inlet pressure. Important advantages are provided by such a reverse clearance arrangement as will be described more particularly below.

According to another aspect of the invention in the present application, there is provided a drip irrigation emitter, comprising: a cylindrical tube for conducting water therethrough; a plurality of cylindrical housings secured within the tube at longitudinally-spaced locations thereof; and an elastomeric membrane secured on one face to a face of each cylindrical housing such as to define therewith a flow control passageway having an inlet communicating with the interior of the tube, and an outlet communicating with an outlet opening through the tube, the opposite face of the elastomeric membrane being subject to the water pressure within the tube whereby the membrane is deflected towards and away from the face of the cylindrical housing to vary the flow control passageway in response to variations in the water pressure within the tube, each of the elastomeric membranes being secured to the outer face of its respective cylindrical housing to define the flow control passageway therewith.

According to a still further aspect of the invention in the present application, there is provided a flow regulator device for insertion into a tube for a pressurized fluid having an outlet opening for discharging the fluid at a regulated rate via the flow regulator device; the flow regulator device comprising: a cylinder of elastomeric material formed on its outer face with baffles to define, with the inner face of the tube, a labyrinth passageway having an inlet end communicating with the pressurized fluid in the tube, and an outlet end communicating with the outlet opening in the tube; the baffles being configured to define, with the inner face of the tube, a plurality of clearances of increasing height in the direction from one of the ends to the other of the ends such that the clearances are sequentially closed by the deformation of the elastomeric cylinder with increasing pressure within the tube to maintain a substantially uniform flow through the outlet opening of the tube in response to variations in the pressure of the pressurized fluid within the tube.

Further features and advantages of the invention will be apparent from the description below.

BRIEF DESCRIPTION OF THE DRAWINGS

The invention is herein described, by way of example only, with reference to the accompanying drawings, wherein:

FIG. 4 is a top plan view of the emitter housing of FIG. 1;

FIG. 5 is a view similar to that of FIG. 1 but illustrating the condition of the emitter when subjected to a high inlet pressure;

FIGS. 6, 7 and 8 are views corresponding to FIGS. 1, 2 and 3a illustrating another form of drip irrigation emitter constructed in accordance with the present invention;

FIGS. 8a and 8b are sectional views along lines 8a and 8b of FIG. 6; whereas

FIG. 14 is a longitudinal sectional view illustrating another drip irrigation emitter constructed in accordance with the present invention;

FIG. 15 is a view similar to that of FIG. 14 but illustrating a modification in the construction of the emitter;

FIG. 16 is a sectional view illustrating a still further form of drip irrigation emitter constructed in accordance with the present invention;

FIG. 17 is a plan view illustrating the baffle construction in the emitter of FIG. 16;

FIG. 18 is a view similar to that of FIG. 16 but illustrating the condition of the emitter when subjected to a high inlet pressure;

FIG. 19 is a view similar to that of FIG. 16, but illustrating a modification;

FIGS. 28, 29 and 30 are plan views at three different 90° positions, illustrating only the emitter housing in an emitter unit including the reverse arrangement of baffles of FIGS. 27a–27c.

FIG. 41 is a three-dimensional view illustrating the flow restrictor device in the emitter of FIG. 38;

FIGS. 42 and 43 are side elevational views illustrating opposite sides of the flow regulator device of FIG. 41;

DESCRIPTION OF PREFERRED EMBODIMENTS

The Device of FIGS. 1–5

Figure 1:
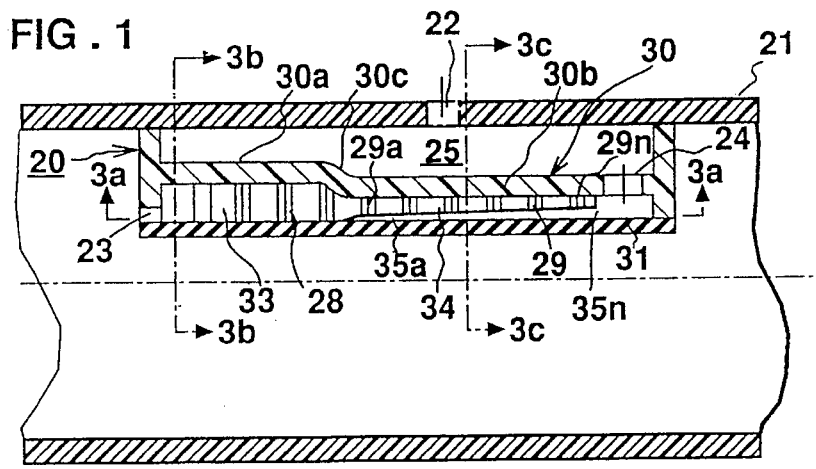
FIG. 1 is a sectional view illustrating one form of drip irrigation emitter constructed in accordance with the present invention.
Figure 2:
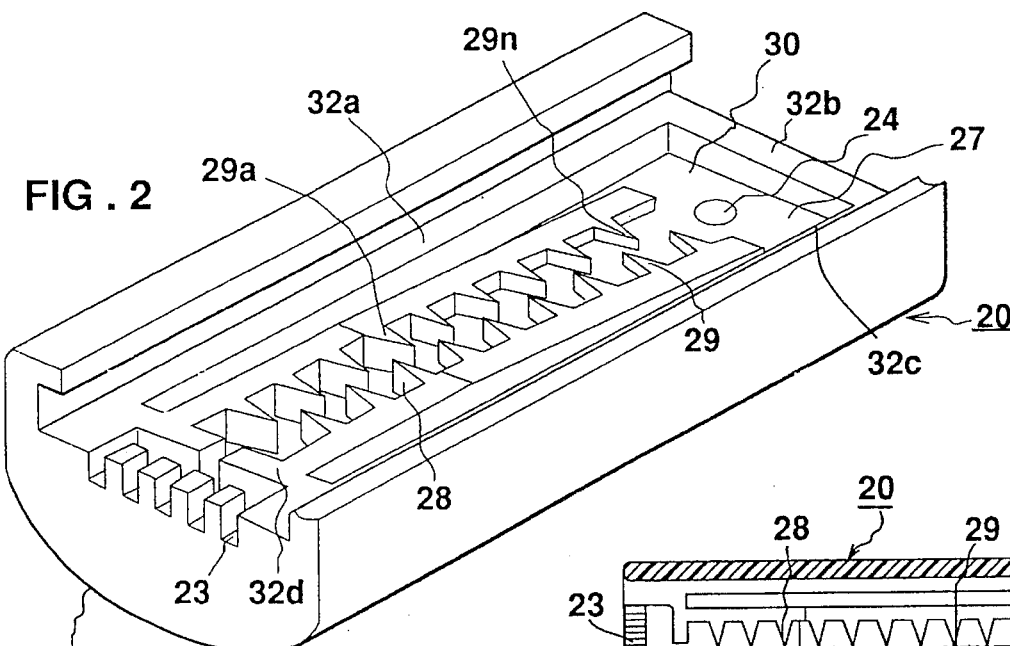
FIG. 2 is a three-dimensional view more particularly illustrating the construction of the housing of the emitter unit of FIG. 1.
Figure 3A:
FIGS. 3a, 3b and 3c are sectional views along lines 3a, 3b and 3c of FIG. 1.
Figure 3B:
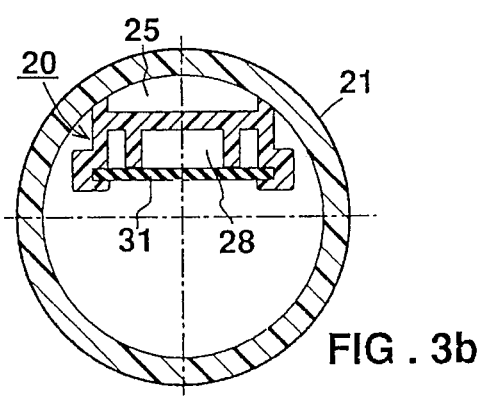
Figure 3C:
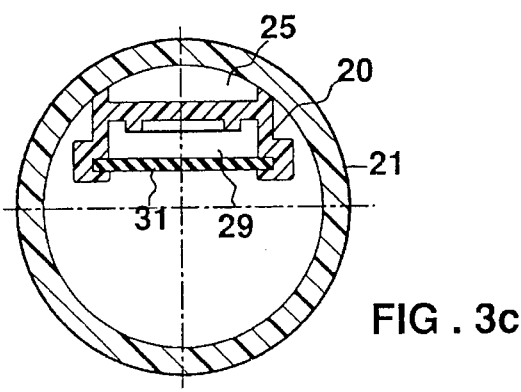

FIGS. 1–5 of the drawings illustrating a drip irrigation emitter including a housing 20 in the configuration of a linear strip and is bonded to the inner face of the water supply tube 21 at one of its outlet openings 22. The emitter housing 20 is formed with an inlet opening 23 communicating with the interior of the water supply tube 21, and an outlet opening 24 communicating with the tube outlet opening 22 via an outlet chamber 25. The outer surface of emitter housing 20 is rounded, as shown at 26 (FIG. 2), to conform to the curvature of the inner face of tube 21 to which it is bonded.

The inner face of housing 20 is formed with a cavity 27 which includes two groups of baffles 28, 29 integrally formed with wall 30 of the housing defining one side of its cavity 27. The opposite side of cavity 27 is defined by an elastomeric membrane 31 fixed to ledges 32a, 32b, 32c and 32d, circumscribing the cavity 27.

It will thus be seen that wall 30 and elastomeric membrane 31 of the housing 20 define a passageway between the inlet opening 23 and the outlet opening 24, and that this passageway includes two labyrinths: labyrinth 33 defined by baffles 28 between wall 30 and membrane 31; and labyrinth 34 defined by baffles 29 between wall 30 and membrane 31.

Baffles 28 are of the same thickness and extend the complete space between wall 30 and membrane 31. Baffles 29 are of uniformly decreasing thickness, decreasing towards the outlet 24 as shown by baffles 29a–29n in FIGS. 1 and 2; these baffles thereby define, with respect to membrane 31, clearances of increasing heights towards the outlet 24, as shown by clearances 35a–35n in FIG. 1.

As also shown in FIG. 1, section 30a of housing wall 30 occupied by baffles 28 is spaced a greater distance from membrane 31 than housing wall section 30b occupied by baffles 29; the two housing sections are connected by a step 30c.

It will be appreciated that a plurality of emitter units, each including a housing 20 and a membrane 31 bonded thereto to define the two labyrinths 33 and 34 between inlet opening 23 and outlet opening 24, are bonded to the inner surface of the water supply tube 21 at spaced intervals along its length, and that the water supply tube is provided with an outlet opening 22 in communication with the outlet chamber 25 of each emitter unit.

The emitter illustrated in FIGS. 1–5 operates as follows:

When the water supply pressure within the tube 21 is low, membrane 31 will be in the position illustrated in FIG. 1. In this position, the membrane engages the outer surfaces of baffles 28, but not the outer surfaces of baffles 29, so that the baffles 28 of labyrinth passageway 33, adjacent to the inlet opening 23, will be fully effective to restrict the flow of the water. However, baffles 29 of labyrinth passageway 35 will be only partially effective in restricting the water flow, since their clearances 35a–35n will substantially reduce the resistance of the water flow through this labyrinth passageway.

Now, as the pressure within the tube increases, membrane 31 will be deflected towards housing wall section 30b, as shown in FIG. 5. The initial deflection will cause it to engage only the outer surface of the leftmost baffle 29a, i.e., the one adjacent the step 30c. When membrane 31 thus contacts baffle 29a, that baffle will be fully effective to increase the resistance to the flow, but all the baffles downstream thereof towards the outlet opening 24 will still be only partially effective, and therefore only a slight increase in the flow restriction will be produced. However, as the pressure within tube 22 increases, membrane 31 will be deflected more and more towards wall section 30b, thereby closing more and more of the clearances between it and the outer surfaces of baffles 29, thereby making these downstream baffles more and more effective in restricting the flow.

The large spacing between wall section 30a and the membrane 31 in the inlet labyrinth 33 assures that there will be a relatively low drop in flow when pressurized water is first applied to the housing inlet opening 23, so that the outlet flow will quickly build up to the regulated value. As soon as the regulated value is reached, membrane 31 will begin to deflect, in response to increases in the inlet pressure, to successively close the clearances between it and baffles 29 in the labyrinth passageway 34, and thereby to maintain a relatively constant output flow under increasing inlet pressures.

The construction illustrated in FIGS. 1–5 enables the drip irrigation emitter to have relatively large passageways during even high pressure conditions, thereby decreasing the sensitivity of the emitters to clogging by particles in the irrigation water. In case the passageway does become clogged by a large particle, the pressure will build up at the inlet side of the particle until membrane 31 deflects to release the particle and to wash it out through the outlet openings 24 and 22, both of which may be very large. The closing of each of the clearances 35a–35n, in response to an increase in the inlet pressure, introduces a small change in the effective resistance imposed by the baffle whose clearance was closed, as well as in all the other baffles downstream thereof, to the flow through labyrinth passageway 34, thereby providing a relatively smooth and uniform regulation of the outlet flow. Further, even under very low pressure conditions wherein the labyrinth passageway 34 imposes a very low resistance to restrict the flow, all the spaces within this labyrinth still communicate with the water flow to the outlet opening 24, thereby effecting a self-rinsing of both labyrinths 33 and 34, at the start and also at the end, of a water irrigation operation, and thereby keeping these passages relatively clean.

Figure 7:
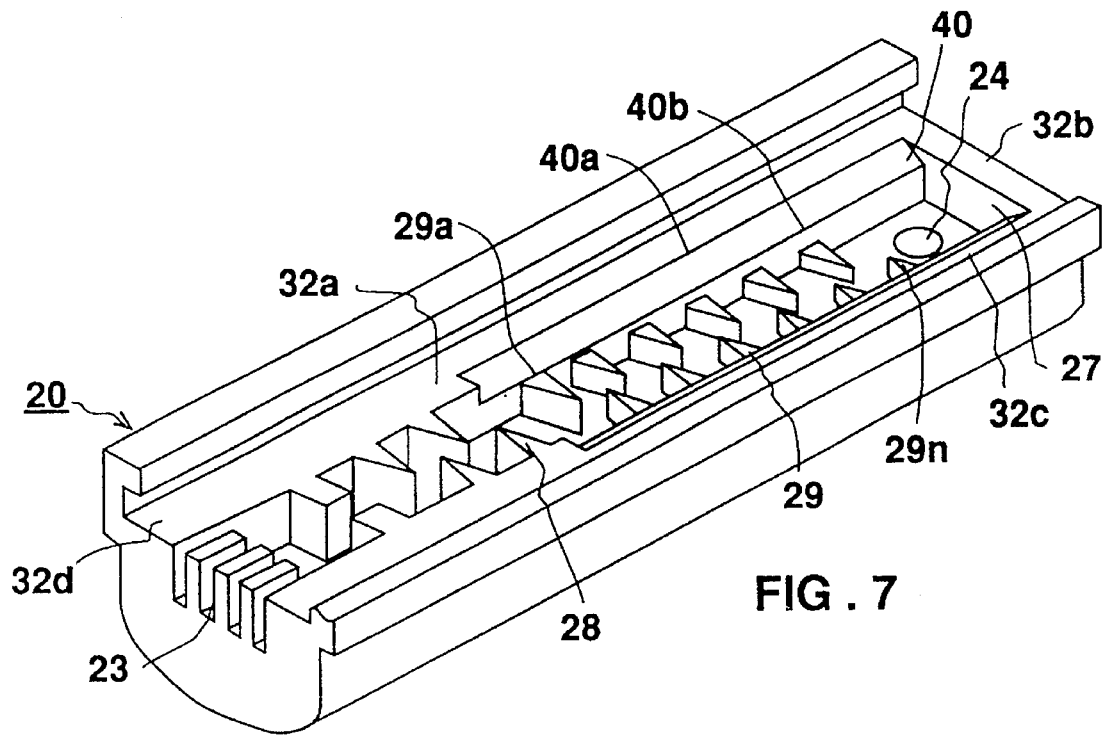
Figure 8:
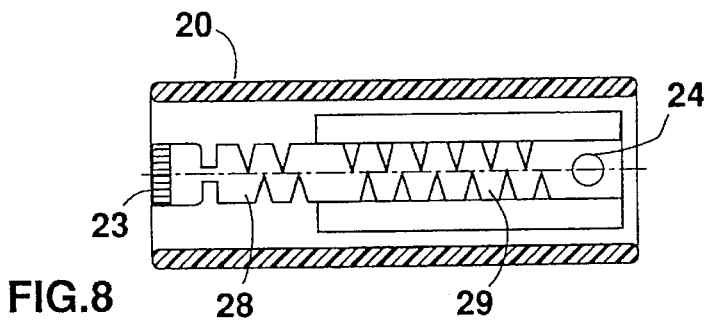

The Device of FIGS. 6–8

FIGS. 6–8 illustrate a construction similar to that of FIGS. 1–5, except that each of the ledges 32a, 32c, on opposite sides of the cavity 27, is formed with an inclined surface 40 for the length of the cavity occupied by the baffles 29 of the labyrinth 34. Surfaces 40 thereby define an outer edge 40a adjacent to its respective ledge 32a (or 32c), and an inner edge 40b adjacent to the cavity 27. The arrangement is such that, initially, the complete membrane 31 between the outer edges 40a of the inclined surfaces 40 on the opposite sides of the cavity is displaced towards the baffles 29 until the membrane contacts the inclined surface 40, and thereafter, only the portion of the membrane between the inner edges 40b of the two inclined surfaces is displaced towards the baffles 29. The outer edge of the baffle 29 having the smallest clearance, i.e., baffle 29a closest to the step 30c in wall 30, is located at the inner edge 40b of the inclined surface 40 adjacent to cavity 27.

Figure 8A:
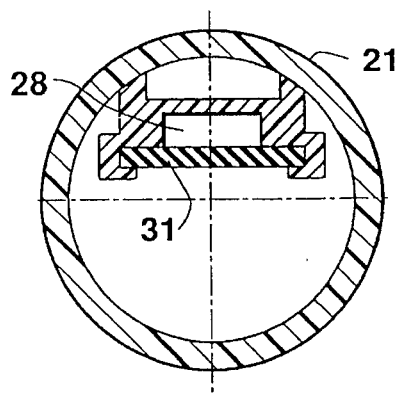
Figure 8B:
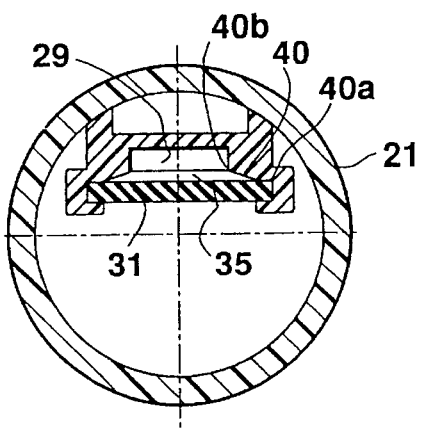
Figure 8C:
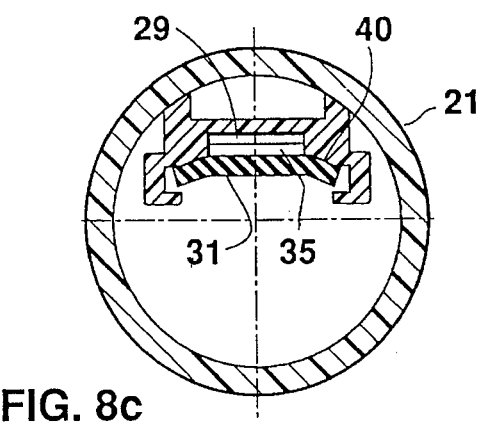
FIG. 8c and 8d are views similar to FIG. 8b but under increased pressure conditions at the housing inlet.
Figure 8D:
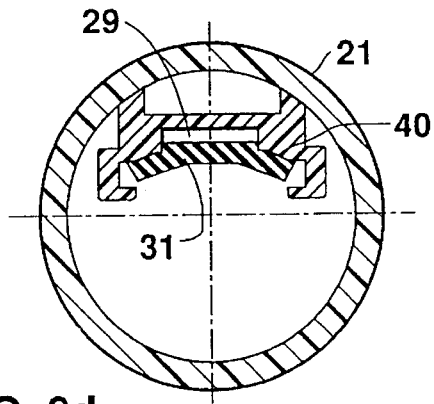

The operation of the construction illustrated in FIGS. 6–8 is more particularly shown in FIGS. 8a–8d. Thus, under initial or low pressure conditions, the membrane 31 assumes the position as illustrated in FIGS. 8a and 8b; FIG. 8a illustrates the membrane in direct contact with baffles 28 of the inlet labyrinth 33; whereas FIG. 8b illustrates membrane 31 spaced by clearances 35 from the outer edges of baffles 29 in the labyrinth passageway 34.

The construction illustrated in FIGS. 6–8 has a low resistance to flow when pressurized water is first applied to the housing inlet opening 23, so that the outlet flow will quickly build up to the regulated value, and will thereafter be regulated to maintain a relatively constant output flow under increasing inlet pressures. This is because the diaphragm will first deflect for its complete surface between the outer edges 40a of the inclined surfaces 40 (FIG. 8c), thereby imposing a low resistance to the flow, but as soon as the diaphragm contacts the inner edges 40b of the inclined surfaces 40, only the portion of the diaphragm between these edges 40b will deflect into the cavity 27 (FIG. 8d), which results in smaller deflections for larger pressures. Inclined surfaces 40 are preferably designed to produce the desired regulated flow at inlet pressures from 0.2 to 1.0 atmospheres, preferably about 0.5 atmospheres, thereby enabling the drip irrigation emitter to be supplied with relatively low line line pressures.

Figure 7A:
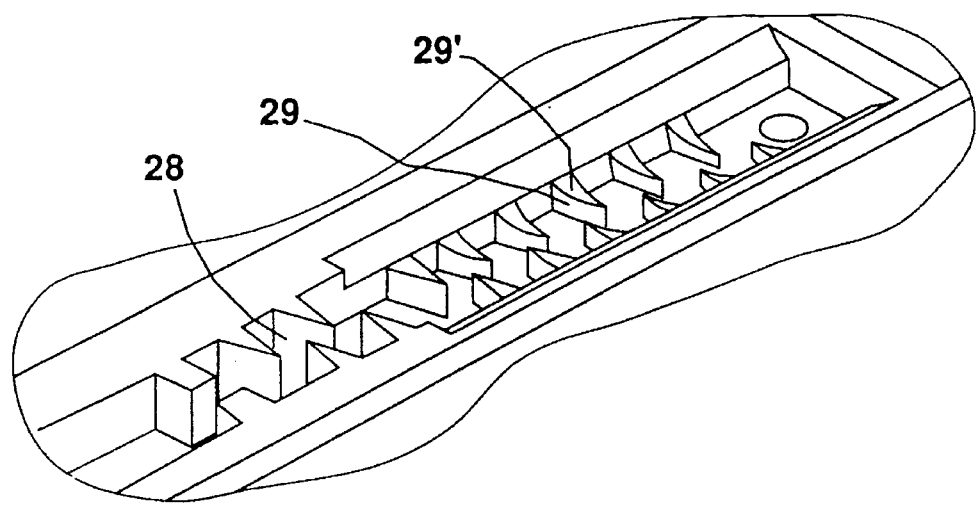
FIG. 7a is a view similar to that of FIG. 7 but illustrating a modification in the construction of the baffles.

FIG. 7a illustrates a construction similar to that of FIG. 7 except that the surface of each of the baffles 29 facing the displaceable wall (elastomeric membrane 31) is inwardly inclined towards its inner tip, as shown at 29'. This improves the contact of the elastomeric membrane with the surfaces of baffles 29 during the sequential closing of the clearances.

Figure 9A:
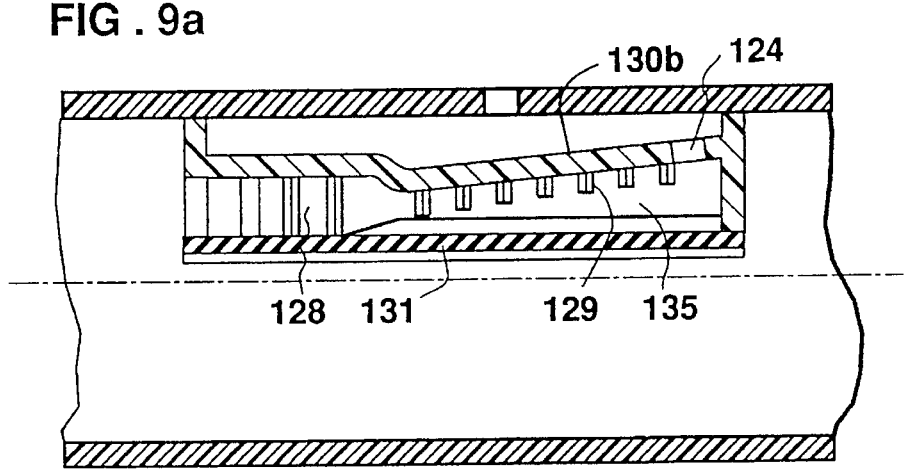
FIGS. 9a, 9b and 9c are views similar to those of FIGS. 1 and 7 but illustrating three different conditions with respect to another emitter constucted in accordance with the invention.
Figure 9B:
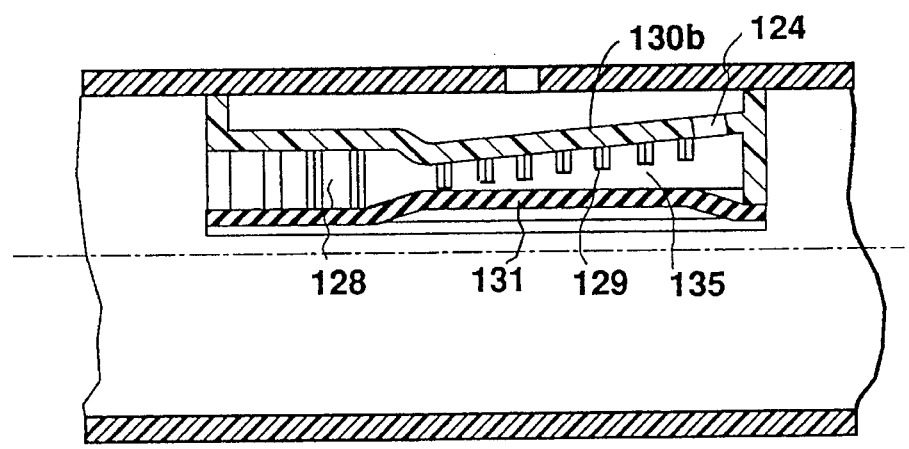
Figure 9C:
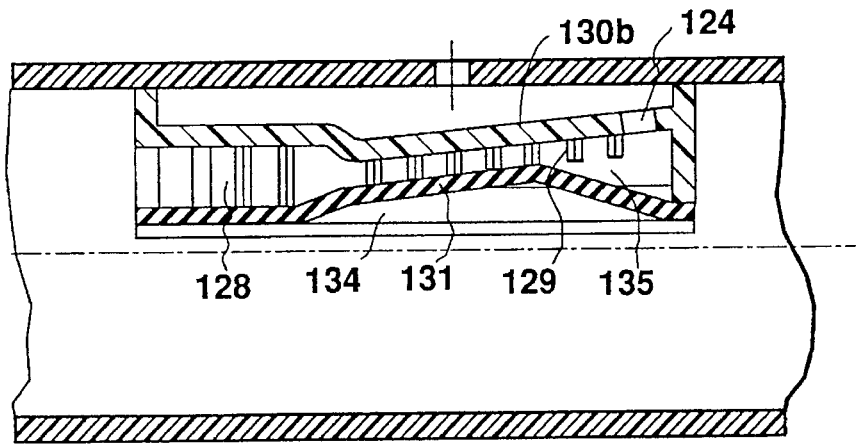
Figure 10:
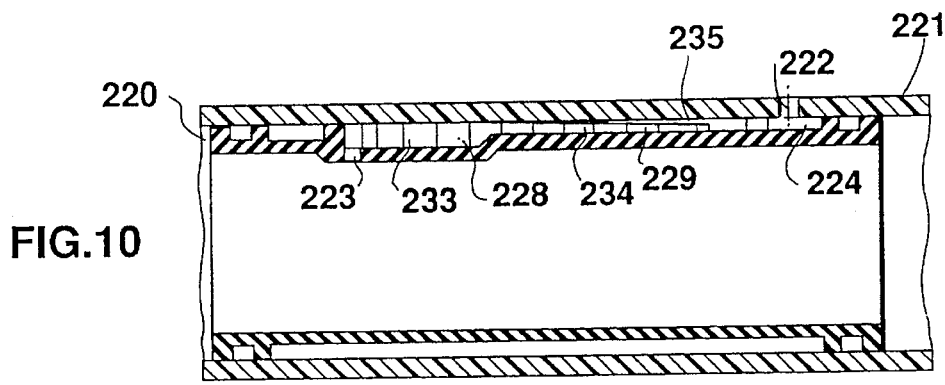
FIG. 10 is a longitudinal sectional view illustrating a further type of drip irrigation emitter constructed in accordance with the present invention.
Figure 11:
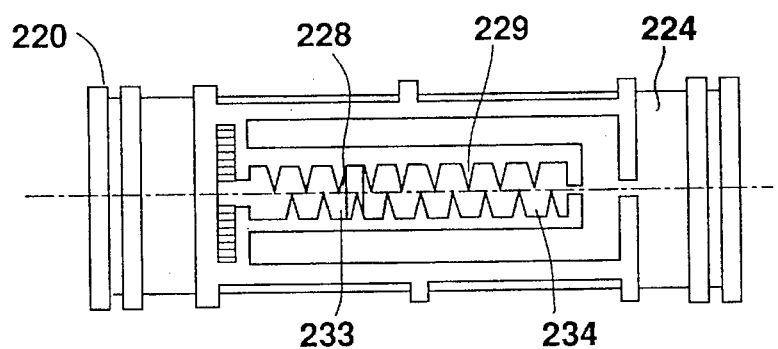
FIG. 11 is a top plan view illustrating only the emitter unit of FIG. 10.
Figure 12:
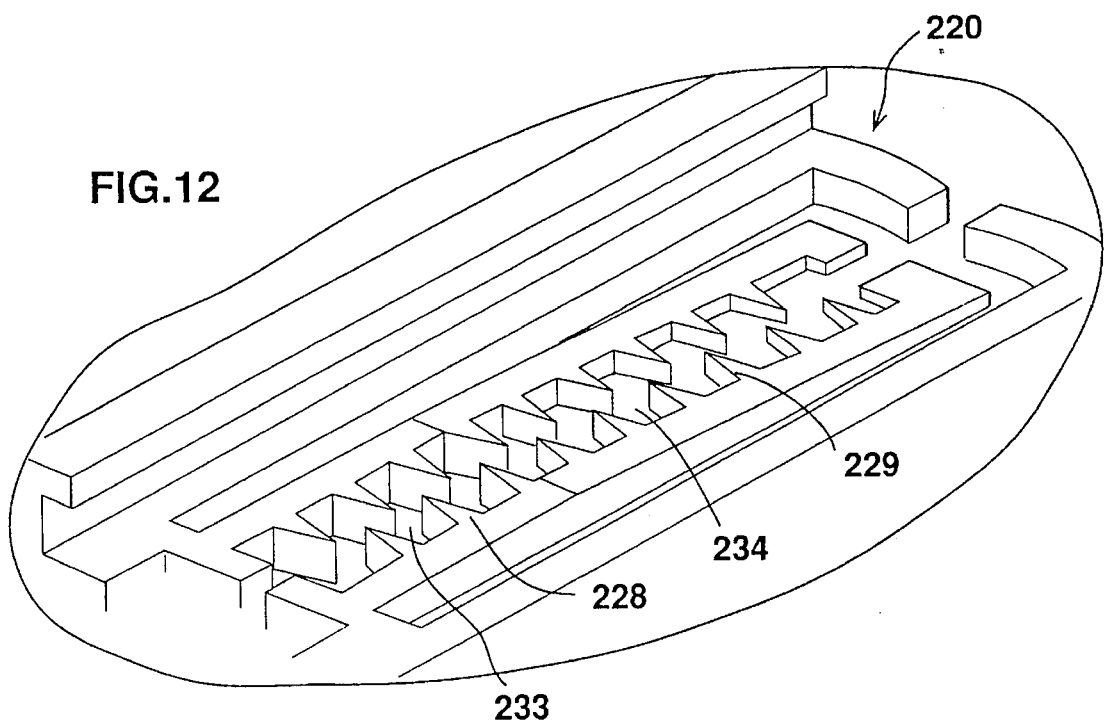
FIGS. 12 and 13 are enlarged fragementary views more particularly illustrating the construction of the emitter of FIGS. 10 and 11.
Figure 13:
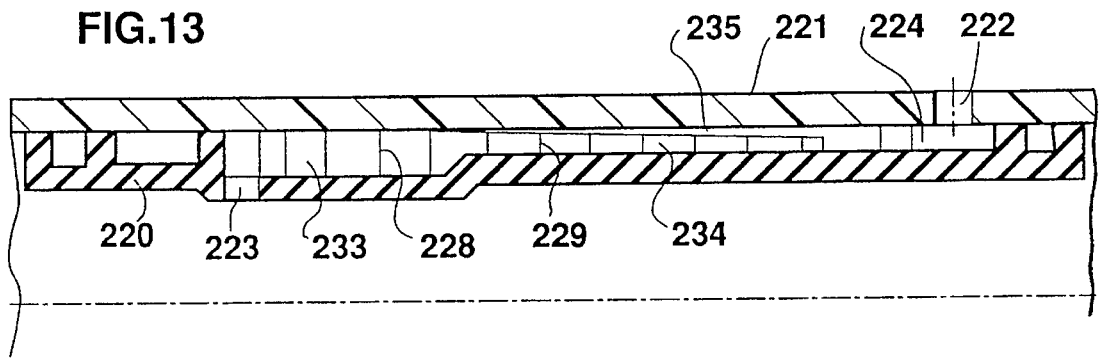

The Device of FIGS. 9a–9c

FIGS. 9a–9c illustrate a construction also including non-regulating baffles 128 and regulating baffles 129, except in this case the regulating baffles 129 are all of the same thickness. However the housing wall section 130b on which they are formed diverges with respect to the membrane 131 in the direction of the housing outlet opening 124 so that they also form clearances 135 with respect to the membrane 131 which increase in length towards the housing outlet opening 124.

The Device of FIGS. 10–13

FIGS. 10–13 illustrate a drip irrigation emitter in which a flow regulator device 220, of cylindrical configuration and made of elastomeric material, is inserted into the water supply tube 221 and is bonded to or pressed against its inner surface. Elastomeric cylinder 220 is formed with an inlet opening 223 communicating with the interior of the water supply tube, and an outlet chamber 224 communicating with the outlet opening 222 formed through the water supply tube. The outer surface of the elastomeric cylindric 220 is formed with baffles 228 adjacent to the inlet opening 223, and baffles 229 adjacent to the outlet opening 224. Baffles 228 are of equal thickness and extend across the complete space between the inner surface of the tube 221 and the outer surface of the elastomeric cylinder 220, to define with the inner surface of tube 221 a labyrinth passageway 233 of fixed resistance to flow. Baffles 229 decrease in thickness in the direction towards the outlet opening 224, and therefore produce clearances 235 of increasing height in the direction of the outlet opening to define a labyrinth passageway 234 having a resistance to flow which varies with the inlet pressure. Baffles 229, being formed on the outer surface of the elastomeric cylinder 220, are displaced with increasing pressure towards the inner surface of the tube 221, to thereby sequentially close the clearances 235 between those baffles and the housing wall with increasing pressure.

Figure 14A:
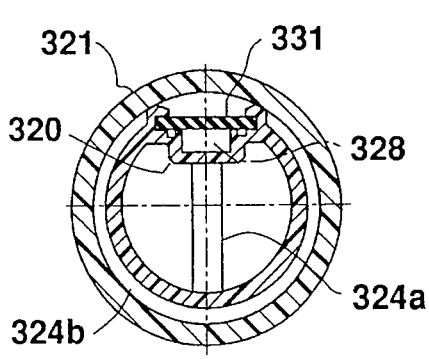
FIGS. 14a and 14b are longitudinal sectional views along lines 14a and 14b of FIG. 14.
Figure 14B:
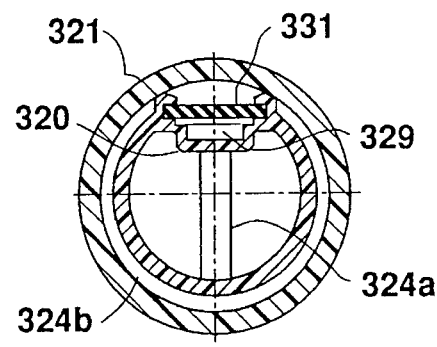

The Devices of FIGS. 14 and 15

FIG. 14 illustrate a construction similar to that of FIGS. 10–13, except that the emitter housing 320 is made of rigid material and cooperates with an elastomeric membrane 331 located on the outer face of the emitter housing. Thus, membrane 331 defines the labyrinth passageways 333 and 334 between the inlet opening 323 communicating with the inlet pressure and the outlet leading to the atmosphere. The emitter outlet includes a diametrically-extending tube 324a and an annular chamber 324b communicating with two outlet openings 322 in the water supply tube 321. In this construction, the baffles 328 are of equal thickness to define labyrinth passageway 333 of fixed resistance to flow, whereas the baffles 329 are of decreasing thickness to form the clearances 335 of increasing heights in the direction of the outlet 324, and thereby to define labyrinth passageway 334 having a pressure-variable resistance to flow.

FIG. 15 illustrates a construction similar to that of FIG. 14, except the elastomeric membrane 431 is provided on the inner surface of the cylindrical housing 420, rather than on its outer surface as in FIG. 14. Accordingly, in the construction illustrated in FIG. 15, the inner surface of the cylindrical housing 420 would be formed with the baffles 428 defining the fixed-resistance labyrinth 433, and also with the baffles 429 defining the labyrinth 434 of pressure-variable resistance.

The Devices of FIGS. 16–19

FIGS. 16–18 illustrate the invention incorporated in a button-type emitter, wherein the housing 520 is constituted of a first part 520a including the inlet opening 523 formed in a nipple connector, and a second part 520b including the outlet opening 524. Part 520b is formed on its inner surface with recesses defining the large baffles 528 communicating with the inlet opening 523, and with the smaller baffles 529 communicating with the outlet opening 524. The two parts are clamped together with an elastomeric membrane 531 in between the two parts, such that the membrane cooperates with baffles 528 to form labyrinth passageway 533, and also cooperates with the baffles 529 to form labyrinth passageway 534. As in the other embodiments, baffles 528 are of equal thickness and extend transversely across the complete space between housing part 520b and membrane 531 so that labyrinth passageway 533 imposes a fixed resistance to the flow between the inlet 523 and the outlet 524. However, baffles 529 are of decreasing thickness so that they define, with membrane 531, clearances 535 of increasing heights towards the outlet opening 524, and thereby the labyrinth passageway 534 having a pressure-variable resistance to flow of the water between the inlet 523 and the outlet 524.

FIG. 19 illustrates a modification in the construction of the emitter of FIGS. 16–18, in that the baffles 529' of pressure-variable flow-resistance are formed in the flat face of part 520b', while the baffles 528' of fixed flow-resistance are formed in the peripheral face of part 520b'.

The Devices of FIGS. 20–30

Figure 20:
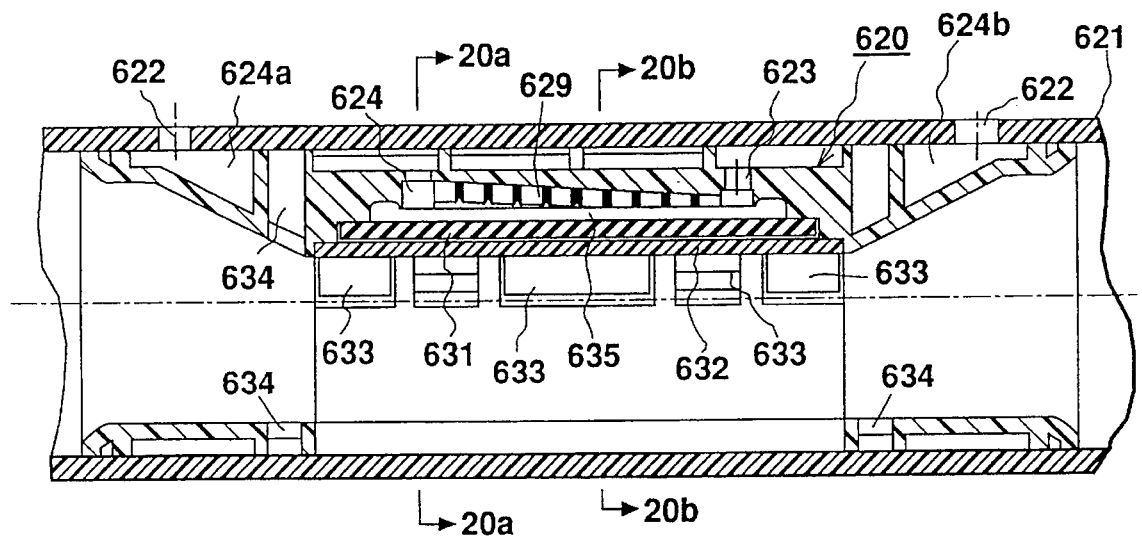
FIG. 20 is a sectional view illustrating a still further form of drip irrigation emitter constructed in accordance with the present invention.
Figure 20A:
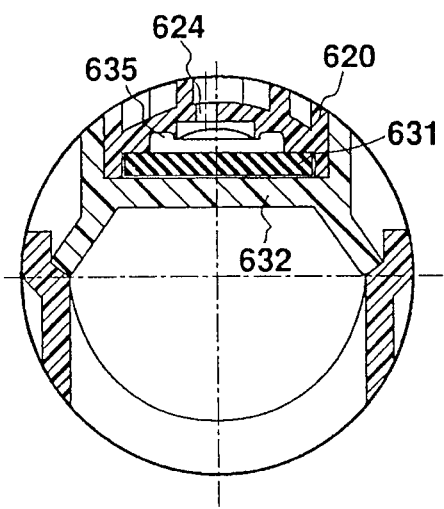
FIGS. 20a and 20b are cross-sectional views along lines 20a and 20b of FIG. 20 but with the outer tube removed.
Figure 20B:
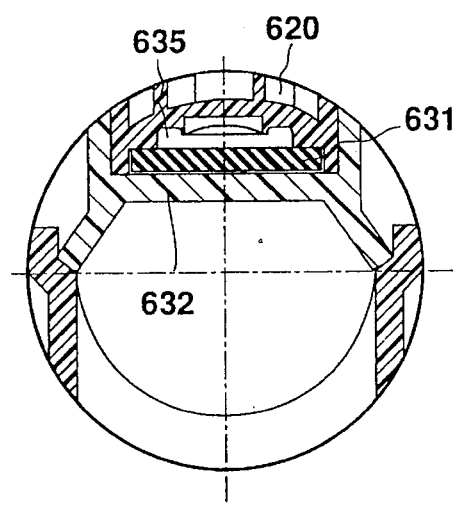
Figure 21:
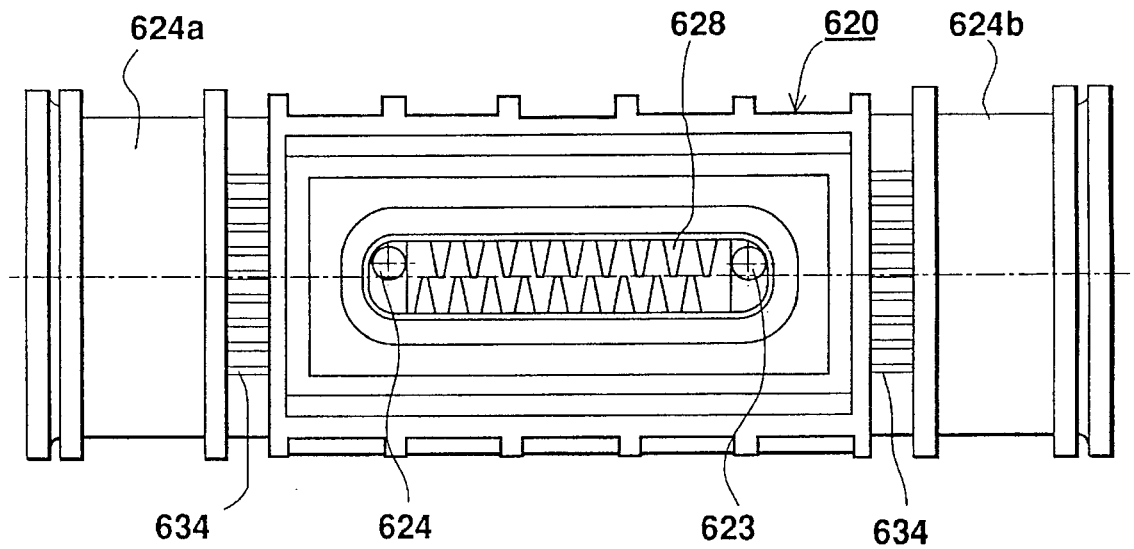
FIGS. 21, and 22 are plan views of the housing of the emitter unit of FIG. 20 at two 180° positions with the outer tube removed.
Figure 22:
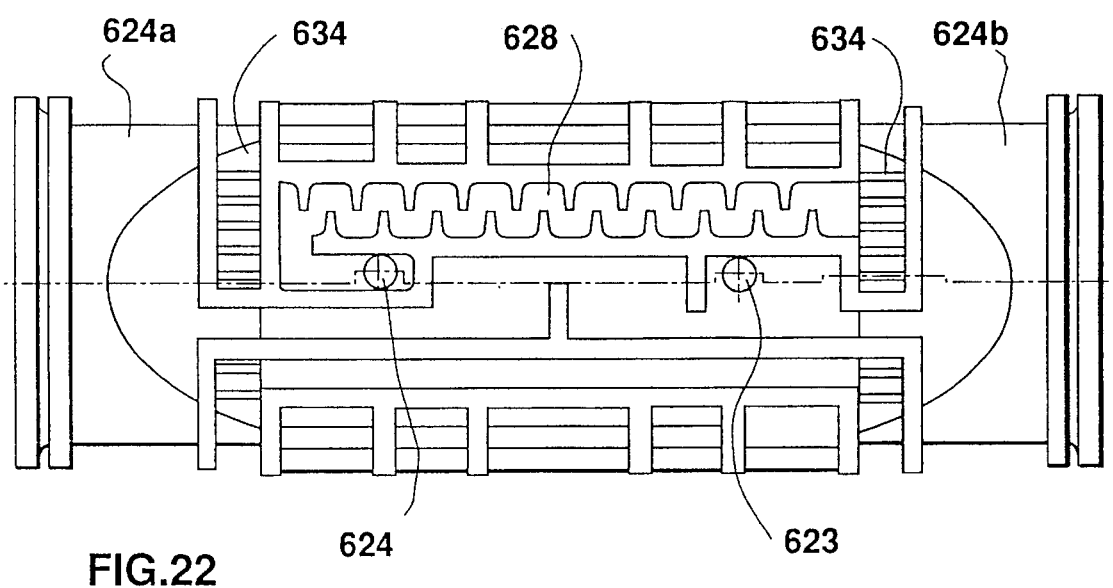
Figure 23:
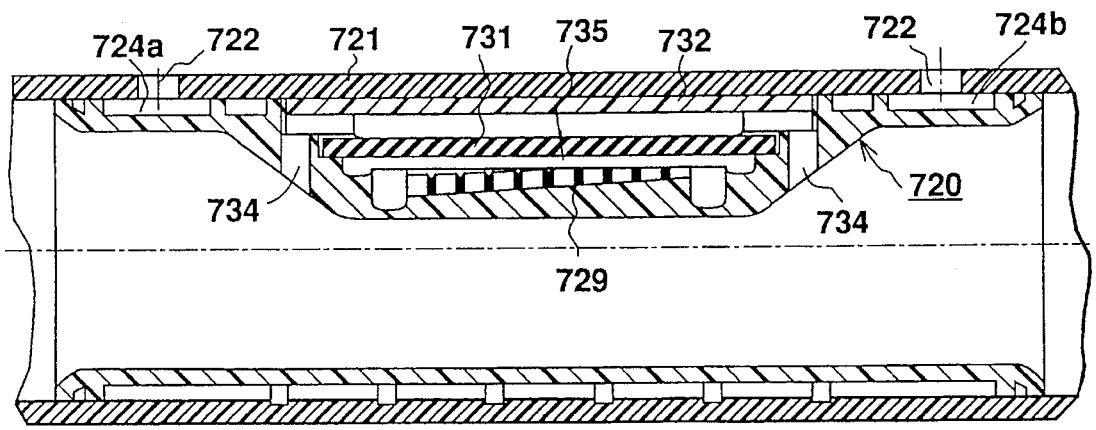
FIG. 23 is a sectional view illustrating a still further form of drip irrigation emitter constructed in accordance with the present invention.
Figure 24:
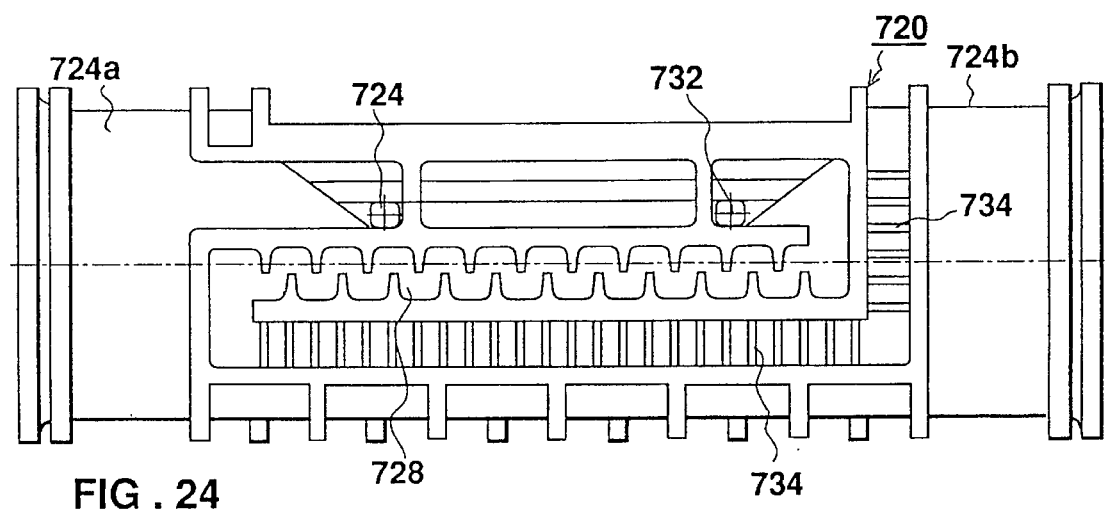
FIGS. 24, 25 and 26 are plan views, at three different 90° positions, illustrating only the emitter housing in the emitter unit of FIG. 23.
Figure 25:
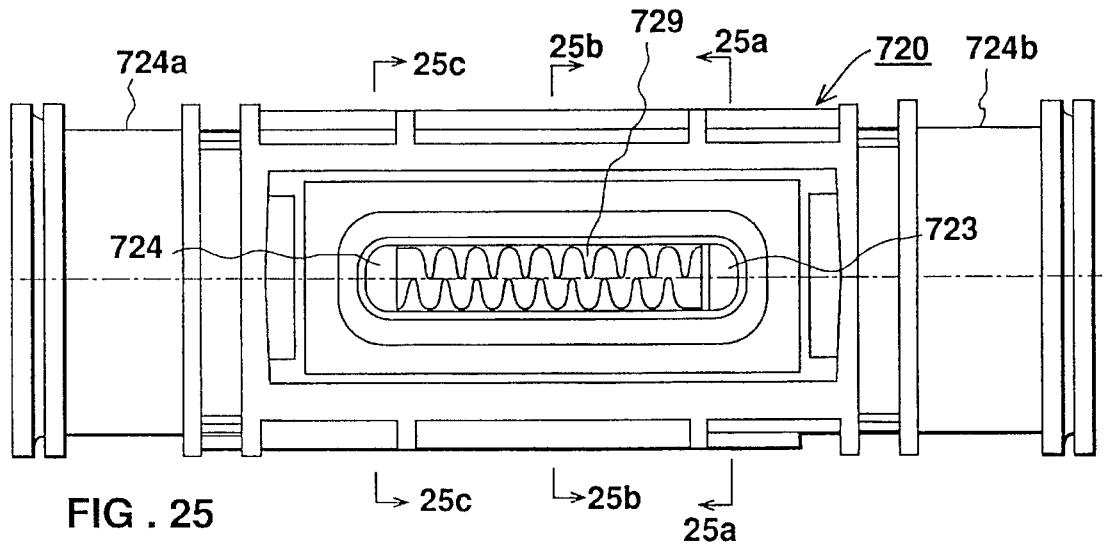
Figure 25A:
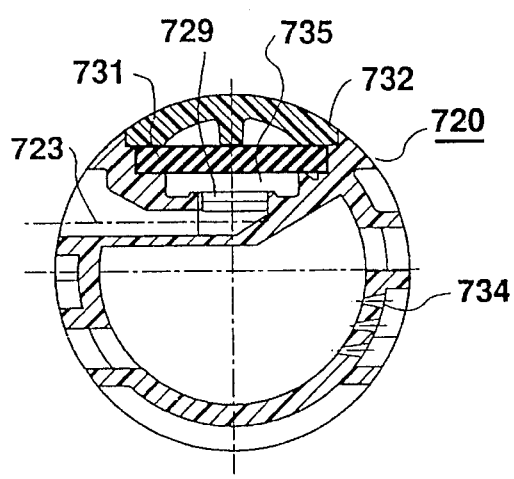
FIGS. 25a, 25b and 25c are sectional views along lines 25a, 25b and 25c of FIG. 25, respectively.
Figure 25B:
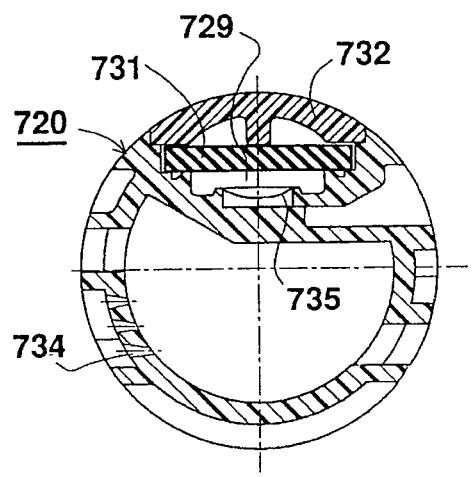
Figure 25C:
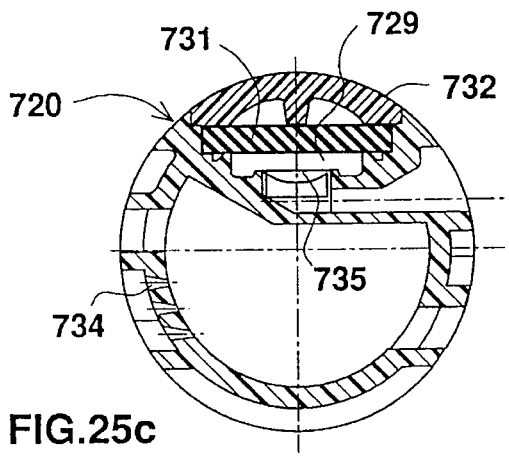
Figure 26:
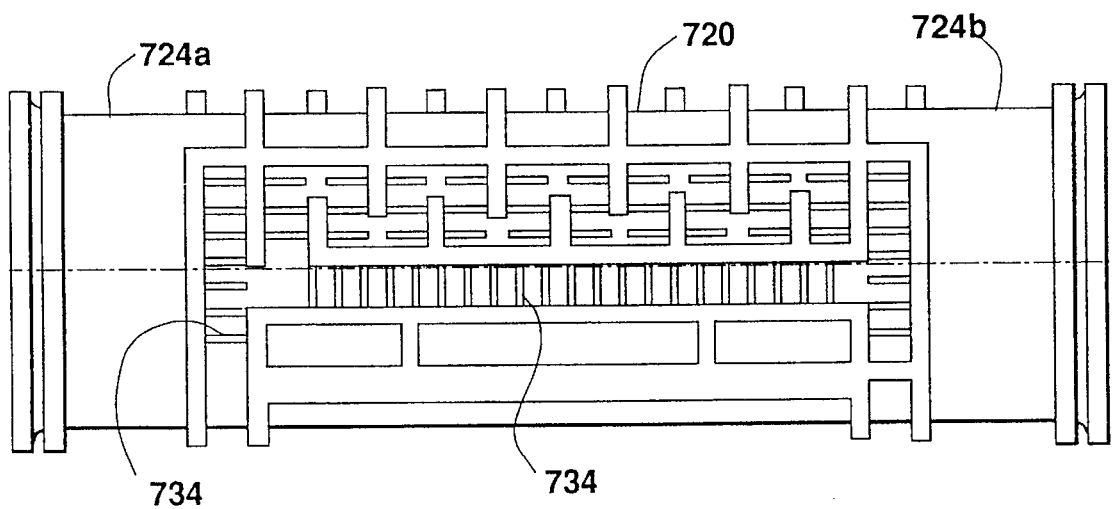

FIGS. 20–22 illustrate a further emitter generally similar to that of FIG. 15. It also includes a cylindrical housing 620 made of rigid material fixed within the water supply tube 621 and cooperable with an elastomeric membrane 631 to define the labyrinth passageways between the inlet opening 623 communicating with the inlet pressure, and the outlet opening 624 communicating with two annular chambers 624a, 624b in alignment with two outlet openings 622 in the water supply tube 621. The elastomeric membrane 631 is secured against the inner face of the cylindrical housing 620 by an inner plastic cap 632 formed with three tabs 633 on each side for closing the cavity in housing 620 for receiving membrane 631. Cap 632 does not seal the cavity so that the inner surface of membrane 631 is subjected to the pressure within tube 621.

Housing 620 is further formed with a plurality of narrow slits 634 therethrough connecting the outer face of housing 620 and membrane 631 to the water pressure within tube 621. That face of membrane 631 cooperates with the flow-regulating baffles 629 to sequentially close the clearances 635 defined by these baffles with increasing pressure of the water within tube 621. The non-regulating baffles 628 (FIG. 22) are formed on the outer surface of the cylindrical housing 620 and cooperate with the inner surface of the tube 621 to define a flow path of fixed flow-resistance from the inlet 623 to the flow-regulating baffles 629. Slits 634 are relatively narrow so that they also serve as filtering passageways blocking the passage of any solid particles in the water from reaching membrane 631 via the outer surface of the cylindrical housing 620.

The water within the tube 621, conducted via slits 634 to the outer surface of housing 620, first traverses the labyrinth defined by the non-regulating baffles 628, flows through the inlet opening 623 to the flow-regulating baffles 629 on the inner surface of the cylindrical housing 620, out through opening 624 to the outer face of housing 620, to the pair of annular chambers 624a, 624b on opposite sides of the housing, and finally through the outlet openings 622 in the tube 621. During the passage of the water through the labyrinth of the flow-regulating baffles 629, the clearances 635 defined by these baffles and the outer surface of membrane 631 will be sequentially closed in the manner described earlier to maintain a substantial uniform flow through the housing outlet 624, and through the tubes outlets 622.

The emitter unit illustrated in FIGS. 23–26 is similarly constructed as that illustrated in FIGS. 20–22 except that the outer surface of the cylindrical housing is formed with both groups of baffles, therein designated 728 (FIG. 24) and 729 (FIG. 25), respectively. Baffles 729 are covered by the elastomeric membrane 731 which is secured in place by an external cap 732. The cylindrical housing is further formed with a large number of narrow slits 734 which conduct the water from the interior of the housing to its external surface and then to the non-regulating baffles 728. From there, the water flows via a throughgoing hole 723 to the flow-regulating baffles 729 and the inner surface of membrane 731. The water then flows through an outlet opening 724 back to the outer surface of housing 720 to annular recesses 724a, 724b on opposite sides of the housing in alignment with outlet openings 722 formed in the tube 721.

FIGS. 27a–27c and 28–30 illustrate a further variation wherein the clearances, therein designated 835, defined by the flow-regulating baffles 829 and membrane 831 are reversely arranged; that is, they are of increasing height in the direction from the housing inlet opening 823 towards the housing outlet opening 824 (opposite to the arrangement of FIGS. 23–26). These clearances are also sequentially closed with increasing pressure of the water within the tube 820 to maintain a substantially uniform flow to and through the housing outlet opening 824.

Figure 27A:
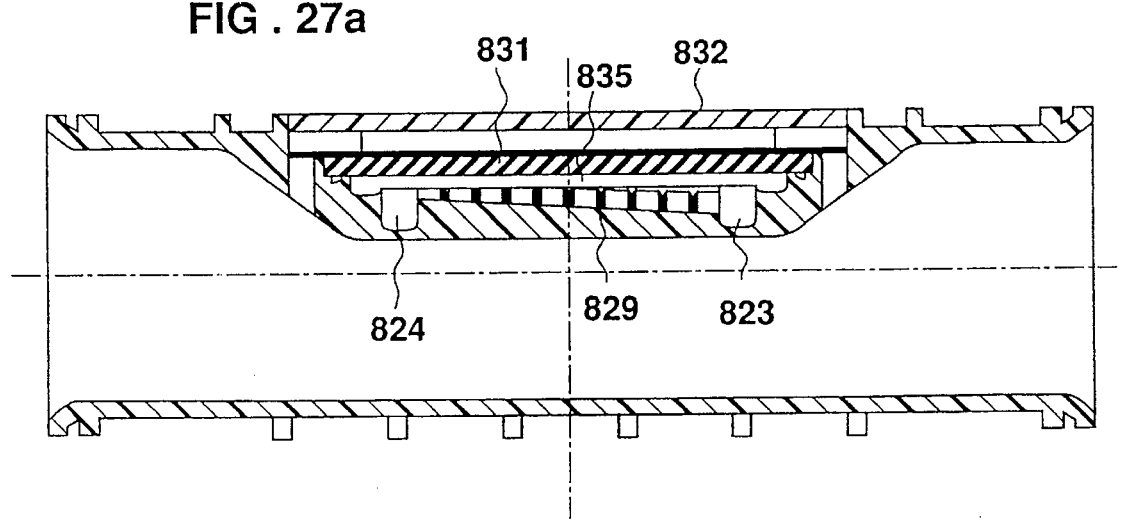
FIGS. 27a, 27b and 27c are sectional views illustrating a reverse clearance arrangement of the regulating baffles under no-pressure, low-pressure and high-pressure conditions, respectively.
Figure 27B:
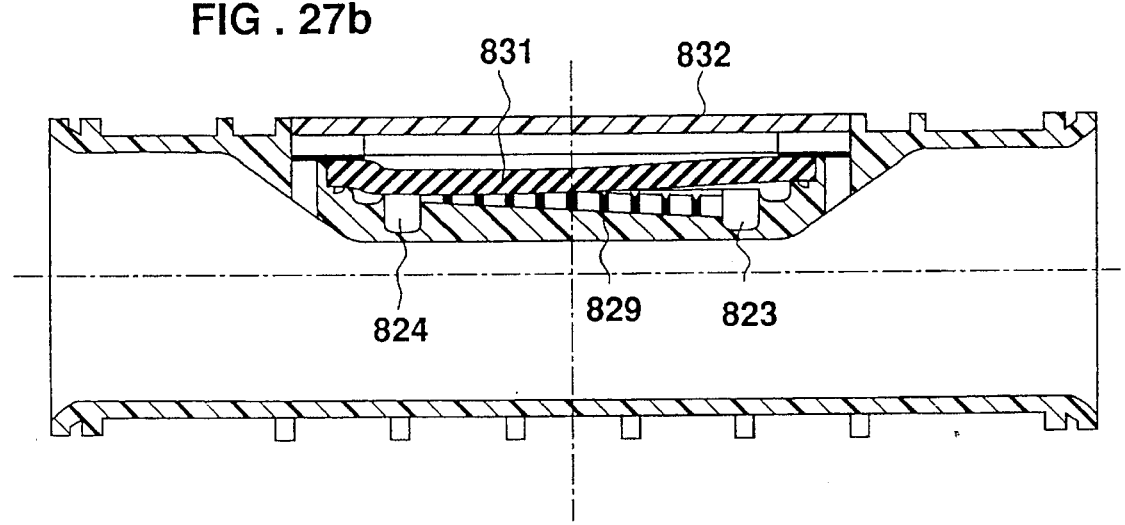
Figure 27C:
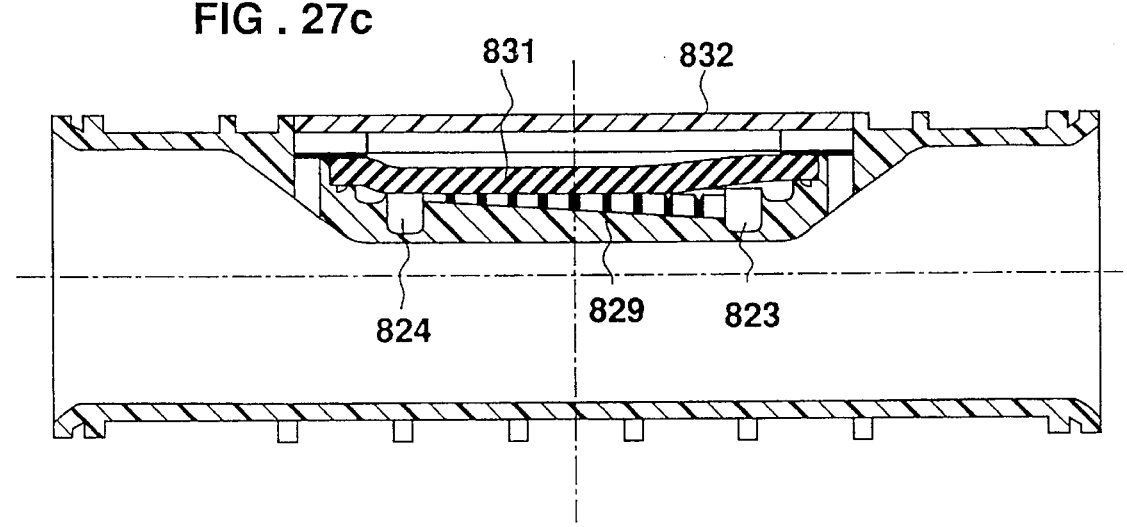
Figure 29:
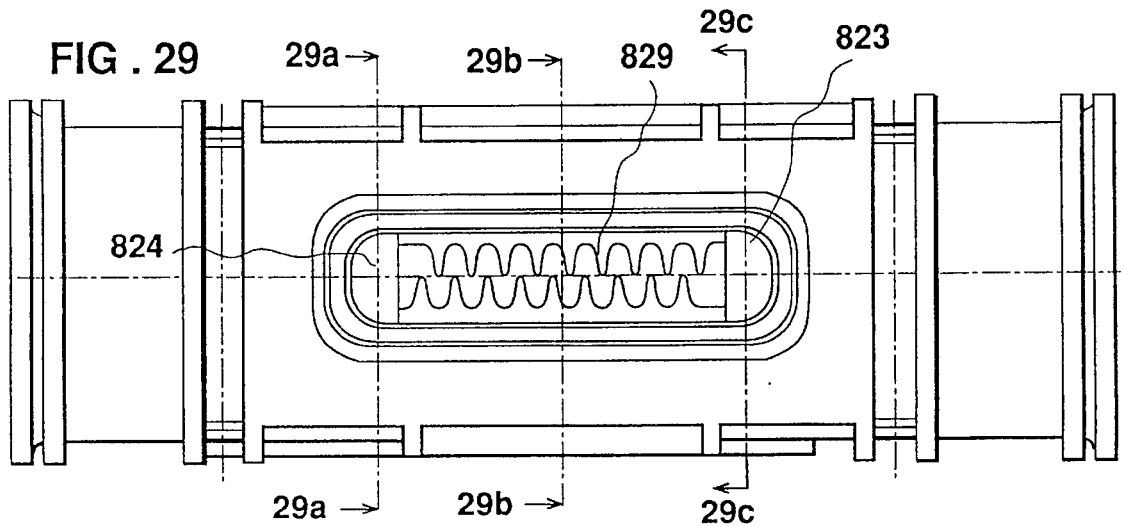
Figure 29A:
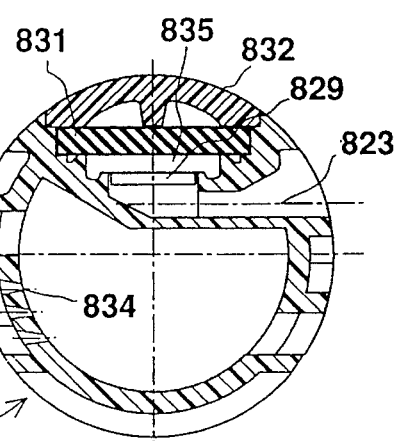
FIGS. 29a, 29b and 29c being sectional views along lines 29a—29a, 29b—29b and 29c—29c in FIG. 29.
Figure 29B:
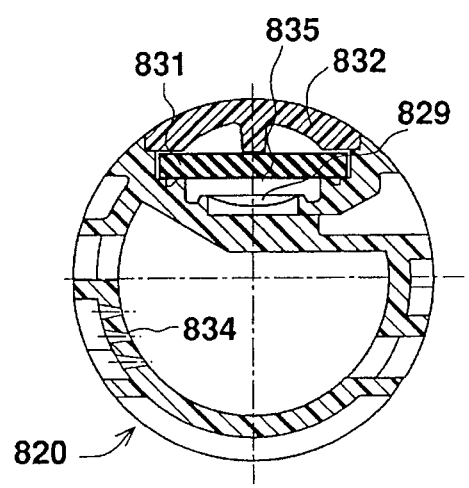
Figure 29C:
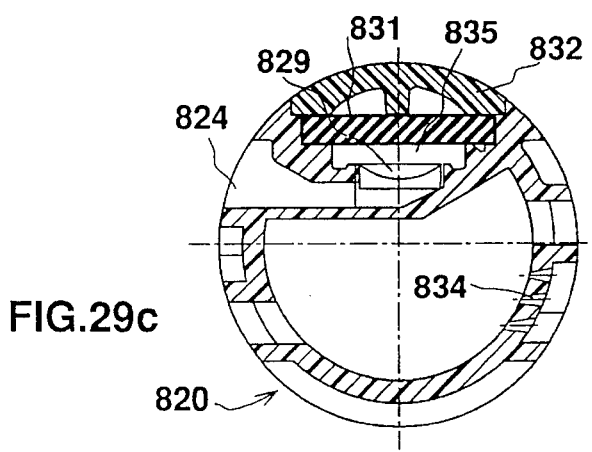
Figure 31:
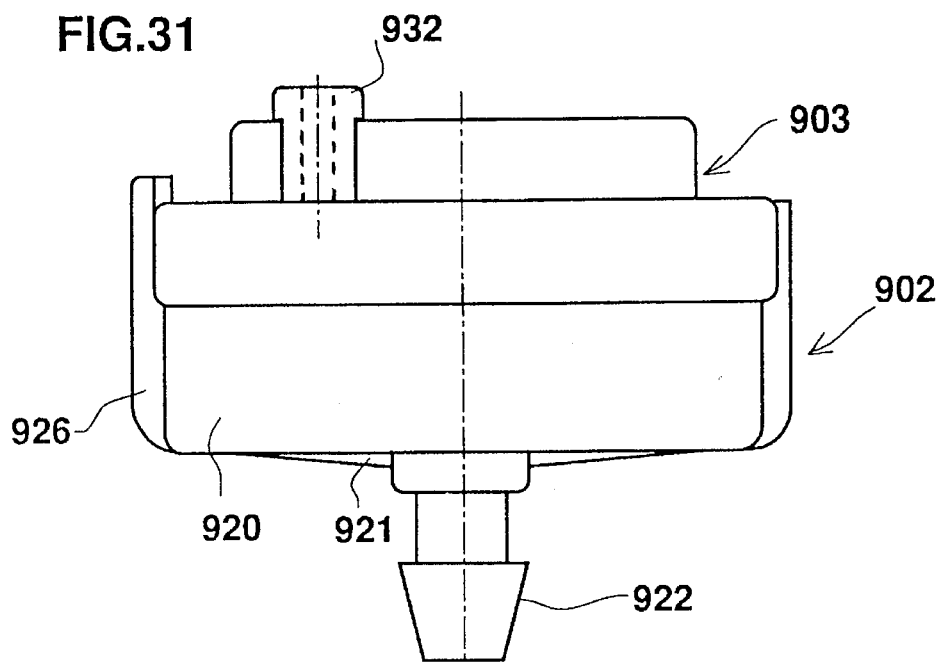
FIG. 31 is a side elevational view illustrating a further form of fluid control device constructed in accordance with the present invention.
Figure 32:
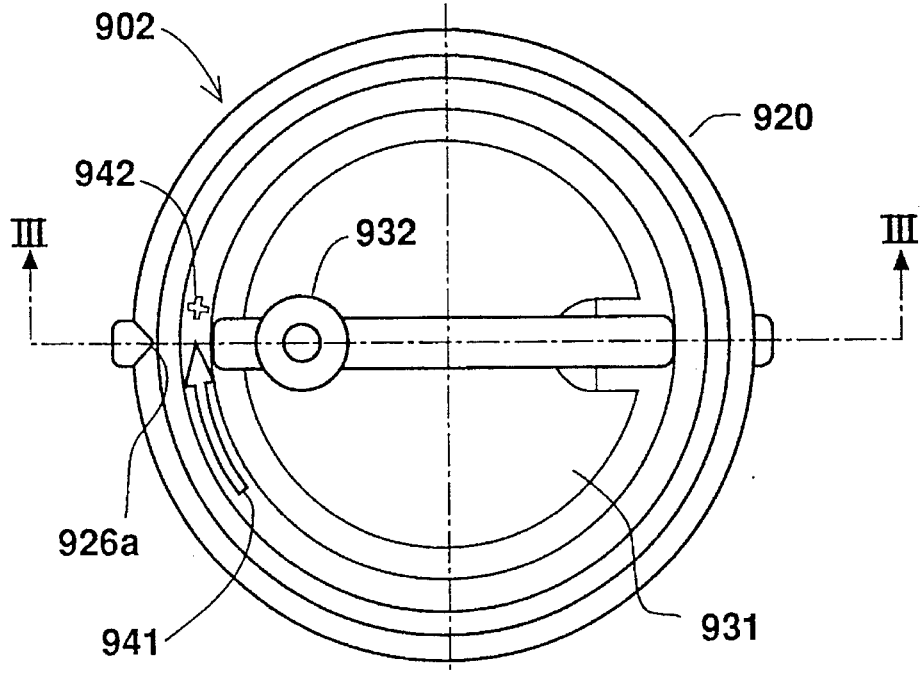
FIG. 32 is a top plan view of the device of FIG. 31.

FIG. 27a illustrates the position of the membrane 831 when the water within the housing is not pressurized, wherein it will be seen that the clearances 835 between baffles 829 and membrane 831 are of the largest height adjacent to the inlet 823 to this labyrinth and decrease in height towards the outlet 824. FIG. 27b illustrates the condition where the water within the housing 820 is under low pressure, whereupon it will be seen that the clearances adjacent the outlet 824 begin to close; and FIG. 27c illustrates the condition where the water within the housing is under high pressure, wherein it will be seen that the membrane 831 sequentially closes more of these clearances from the housing outlet towards the housing inlet.

The arrangements illustrated in FIGS. 23–30 produce a number of important advantages.

Thus, forming the flow-regulating labyrinth defined by baffles 729 on the outer surface of the housing 720 (FIGS. 23–26) provides a larger surface area of the housing to be used for the slits (734, 834) and the fixed labyrinth elements 728, 828; in addition, it more securely holds the membrane 731, 831 in place over the flow-regulating baffles 729, 829. The reverse arrangement of clearances illustrated in FIGS. 27a–27c defined by the flow-regulating baffles 829 also enables the emitter to be used under lower line pressures, produces a self-regulation in response to variations in the water pressure, and also produces a better cleaning action in the event of clogging. When this reverse-clearance arrangement is used, the flow rate may be reset to a new value by changing the fixed resistance provided by the non-regulating baffles (828), and the flow rate will remain relatively constant even with variations in the line pressure.

The Device of FIGS. 31–37

FIGS. 31–37 illustrate a flow control device particularly useful in drip irrigation, but also useful in sprinkler irrigation, medical infusion sets and many other applications in which it is desirable to be able to change a presettable flow rate without significantly affecting the regulating performance of the flow control device to maintain each new preset rate despite variations in the fluid pressure.

The illustrated flow control device comprises a housing constituted of two relatively movable parts 902, 903, and a membrane 904 of elastomeric material clamped between the two parts.

Housing part 902 includes a cylindrical side wall 920 and a disc-shaped transverse end wall 921 integrally formed with an inlet nipple 922 connectible to a source of pressurized fluid. The inner surface of transverse wall 921 is formed with a radially-extending groove 923 leading at one end to the inlet nipple 922, and the opposite end to an axially-extending groove 924 formed in the inner surface of the cylindrical side wall 920 and terminating at a mid-portion of that side wall. The opposite end of side wall 920 is formed with an annular groove 925 for receiving the housing part 903 with a snap-fit. Housing part 902 is further formed with an axially-extending post 926, serving as a fingerpiece to facilitate rotating housing part 902 with respect to housing part 3.

Housing member 903 similarly includes a cylindrical side wall 930, and a disc-shaped transverse wall 931 integrally formed with a nipple 932, the latter nipple serving as the outlet from the housing. Side wall 930 has an outer diameter substantially equal to the inner diameter of side wall 920 of housing part 902 so as to be snugly received within it. Side wall 930 further includes an annular rib 933 receivable with a snap-fit into annular groove 925 of housing part 902 for retaining the two parts in assembled condition while permitting them to be rotated relative to each other.

The outer surface of side wall 930 is formed with a labyrinth passageway 934, including an annular recess 935 extending completely around the circumference of wall 930 except for a short interruption 935a (FIG. 37), and a plurality of baffles 936 extending towards the center line of recess 935 in alternating fashion from one side to the opposite side of the recess. Labyrinth passageway 934 is thus defined by recess 935, baffles 936 and the inner surface of side wall 920 of housing part 902. It is a non-regulating labyrinth passageway; that is, its dimensions do not change with pressure, but rather are fixed except for its length which may be varied by rotating one housing part with respect to the other. Thus, the maximum length of the non-regulating labyrinth 934 is equal to the circumference of side wall 930 less the length of interruption 935a in recess 935. Radial groove 923 and axial groove 924 in the inner surface of housing part 902 serve as the inlet to the non-regulating labyrinth 934; the rotary position of groove 924 with respect to cylindrical side wall 930 of housing part 903 determines the length of the non-regulating labyrinth 934.

The opposite end of recess 935 leads to the outlet end of the non-regulating labyrinth 934 defined by a bore 937 extending through the side wall 930. Bore 937 communicates with a regulating labyrinth 938 extending diametrically across the inner surface of transverse wall 931 of housing part 903.

Regulating labyrinth passageway 938 is formed within a cavity 931a in the inner surface of wall 931 of housing part 903. Cavity 931a is of substantially rectangular configuration (FIG. 34) for receiving the elastomeric membrane 904, which is of the same configuration. Wall 931 is further formed with a second cavity 931b, also of substantially rectangular configuration but of smaller dimensions than cavity 931a. As shown particularly in FIG. 35, cavity 931b is defined by a slanted surface such that the cavity increases in depth from the outlet nipple 932 towards the opposite end of wall 931.

Regulating labyrinth 938 is located in cavity 931b. It includes a second plurality of baffles 939 formed in a recess 940 in cavity 931b and extending towards each other alternatingly from opposite sides of the recess, as shown particularly in FIG. 34. Baffles 939, together with the elastomeric membrane 904, thus define the regulating labyrinth 938 which regulates the flow therethrough in response to variations in the pressure of the pressurized fluid, as will be described more particularly below with reference to FIGS. 33a–33c. End 938a of labyrinth 938 serves as the inlet end since it communicates, via bore 937, with the presettable, non-regulating labyrinth 934; the opposite end 938b of labyrinth 938 serves as the outlet end since it communicates with the outlet nipple 932.

The illustrated flow control device may be assembled by placing the elastomeric membrane 904 within the correspondingly-shaped cavity 931a on the underface of housing part 903, and then forcing housing part 902 into housing part 903 such that the annular rib 933 of housing part 903 snaps into the annular groove 925 of housing part 902. When the device is so assembled, baffles 936 around the circumference of housing part 903 define the non-regulating labyrinth 934 with the adjacent surface of housing part 902; and baffles 939 formed on the inner face of wall 931 of housing part 903 define the regulating labyrinth 938 with membrane 904.

The non-regulating labyrinth 936 is thus of fixed dimensions except for its length. This length may be preset by rotating part 902 with respect to part 903 to reduce the flow to a desired rate. For a non-regulating labyrinth of maximum length, and therefore of minimum flow rate, groove 924 in part 902 would be aligned with the end of recess 935 on one side of its interruption 935a (right side in FIG. 37) so that the complete length of labyrinth 934 will be effective. To increase the flow rate, part 902 is rotated with respect to part 903 to move groove 924 towards the other side of interruption 935a, thereby shortening the effective length of labyrinth 934.

Rib 926 in part 902, and the outlet nipple 932 in part 903, may serve as fingerpieces for rotating one part with respect to the other. Rib 926 may be pointed, as shown at 926a in FIG. 32, and the upper surface of cylindrical wall 930 in part 903 may be provided with indicia, as shown by arrow 941 and the "+" symbol 942, for visually indicating the reference position of the two housing parts and the direction of rotation of one part with respect to the other to change the preset flow rate of the non-regulating labyrinth 934. Thus, if part 903 is rotated in the direction of arrow 941, this will shorten the effective length of the non-regulating labyrinth 934 to thereby increase the flow rate.

At whatever flow rate is preselected according to the effective length of the non-regulating labyrinth 934 (defined by baffles 936), the regulating labyrinth 938 (defined by baffles 939 and membrane 904) will maintain the flow rate at substantially the preset value irrespective of variations in the pressure of the pressurized fluid at the inlet nipple 922. The manner in which this is done is shown particularly in FIGS. 33a–33c.

Figure 33A:
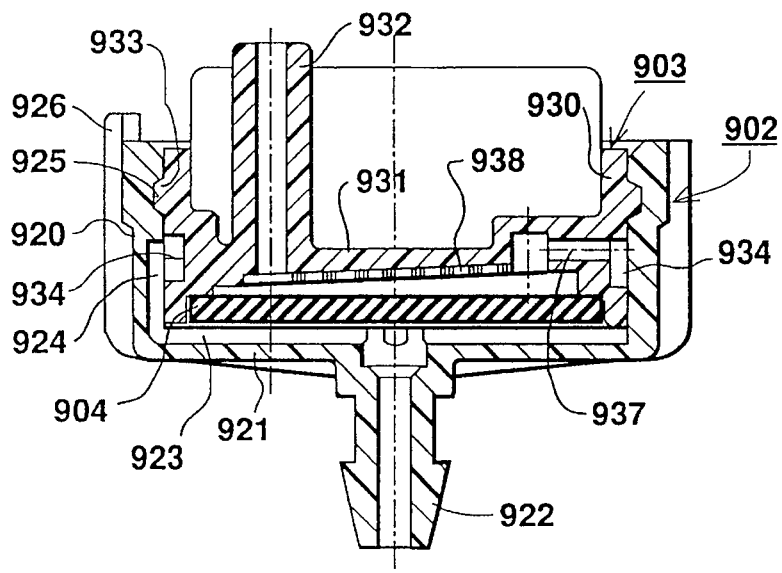
FIGS. 33a, 33b and 33c are sectional views, along line III—III of FIG. 32, illustrating three different pressure conditions of the flow control device.

FIG. 33a illustrates the condition of the flow control device when there is no, or relatively low, fluid pressure at the inlet nipple 922. In this condition, the inclined inner surface of cavity 931b formed with baffles 939 produces a series of clearances between baffles 939 and the adjacent surface of membrane 906 which sequentially increase in height from the outlet end 938b of the regulating labyrinth 938 (adjacent to the outlet nipple 932) towards the inlet end 938a of the regulating labyrinth (adjacent to bore 937) leading to the non-regulating labyrinth 934 defined by baffles 936. These clearances are sequentially closed with an increase in the pressure of the pressurized fluid. Thus, in the no (or low) pressure condition of FIG. 33a, the regulating labyrinth 938 introduces minimum resistance to the flow of the fluid through that labyrinth.

Figure 33B:
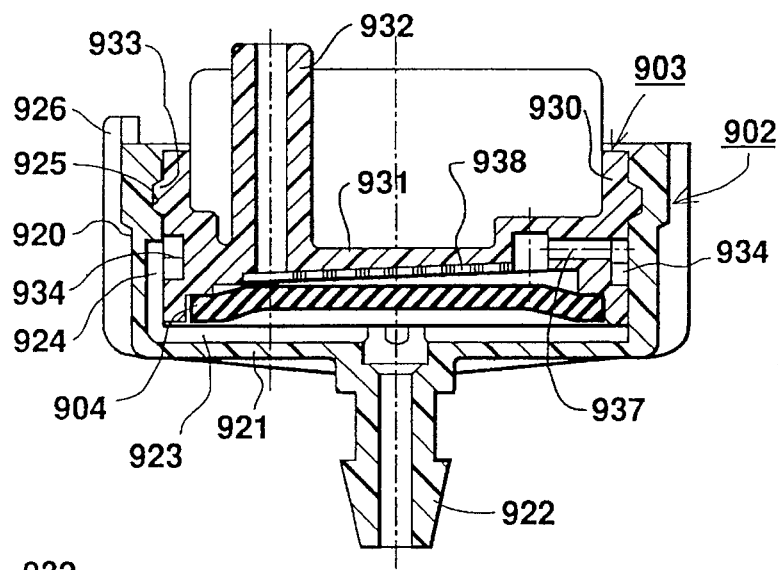

FIG. 33b illustrates the normal-pressure condition of the control device. In this condition, the inlet pressure applied to the outer face of membrane 904 has deformed the membrane such that it has sequentially closed a number of the clearances at the end of the regulating labyrinth 938 adjacent to its outlet end 938b, whereas the clearances adjacent to its inlet end 938a have not been closed but have been decreased in height, thereby introducing resistance to the flow of the fluid through the regulating labyrinth.

Figure 33C:
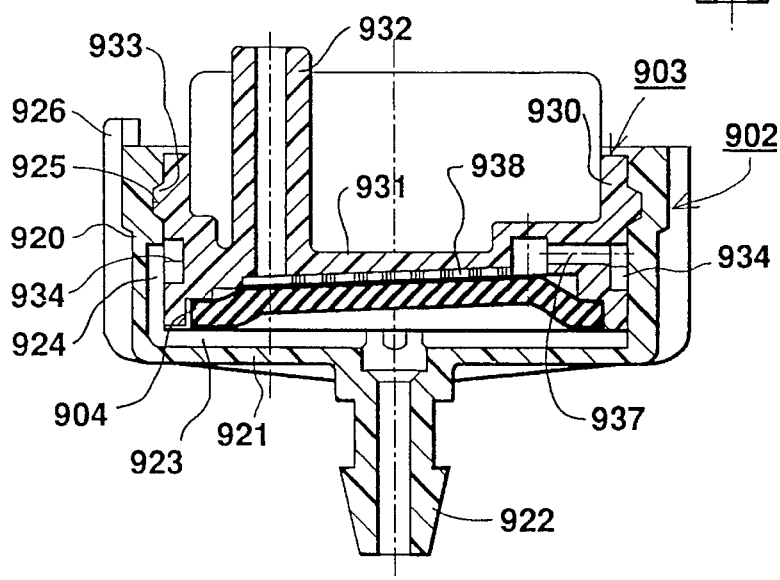
Figure 34:
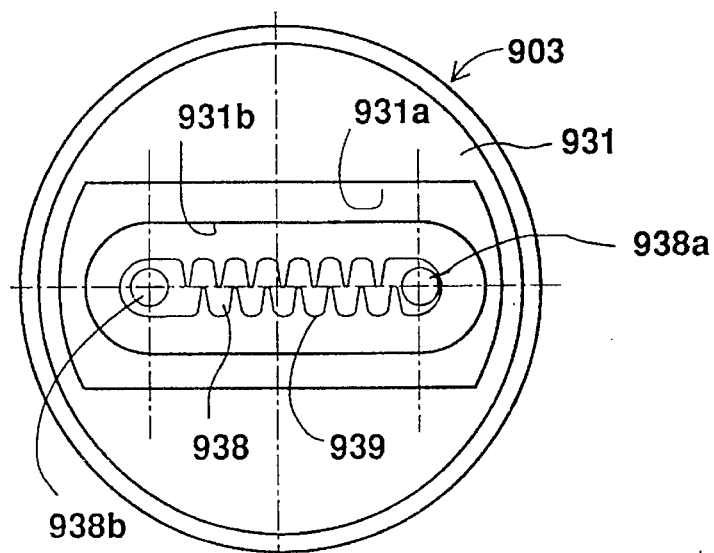
FIG. 34 is a bottom plan view of one of the housing parts in the flow control device of FIGS. 31 and 32.
Figure 35:
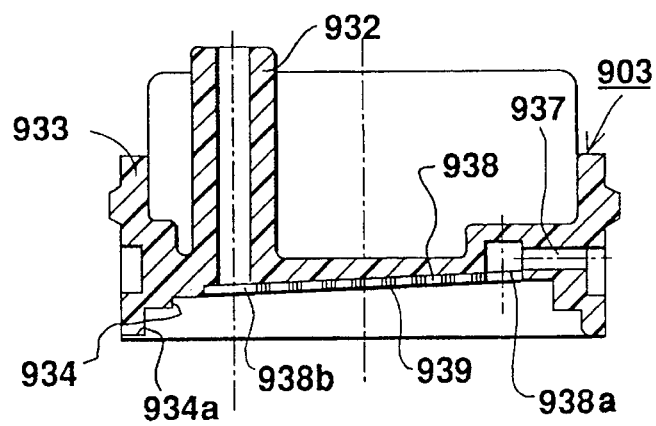
FIG. 35 is a sectional view along line V—V of FIG. 34.
Figure 36:
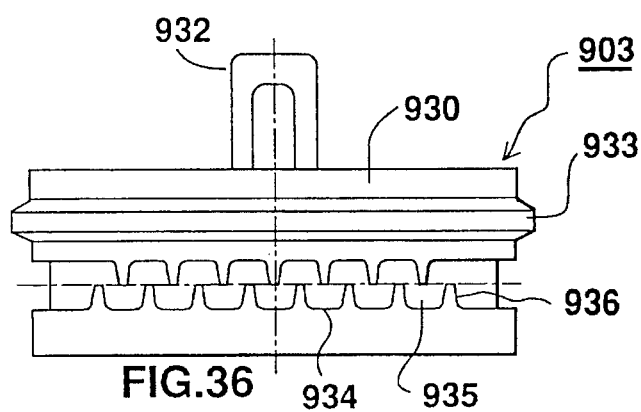
FIG. 36 is a side elevational view from one side of the housing part of FIGS. 34 and 35.
Figure 37:
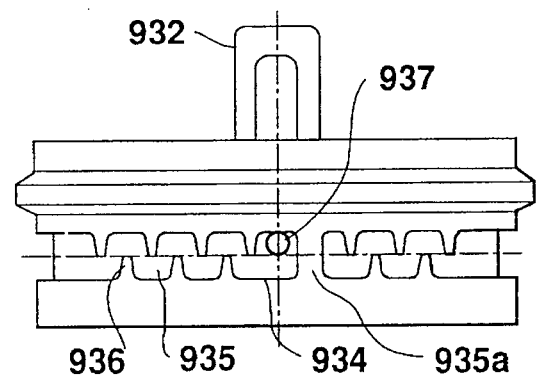
FIG. 37 is a side elevational view from the opposite side of the housing part of FIGS. 34 and 35.
Figure 38:
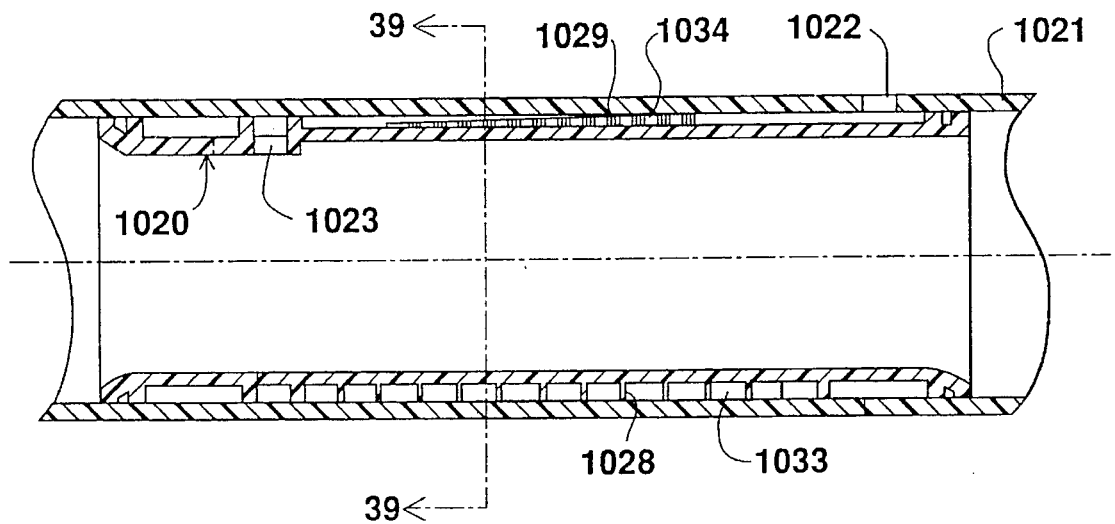
FIG. 38 is a longitudinal sectional view illustrating a drip irrigation emitter similar to that of FIG. 10, but including a modification corresponding to that illustrated in FIG. 31–37.
Figure 39:
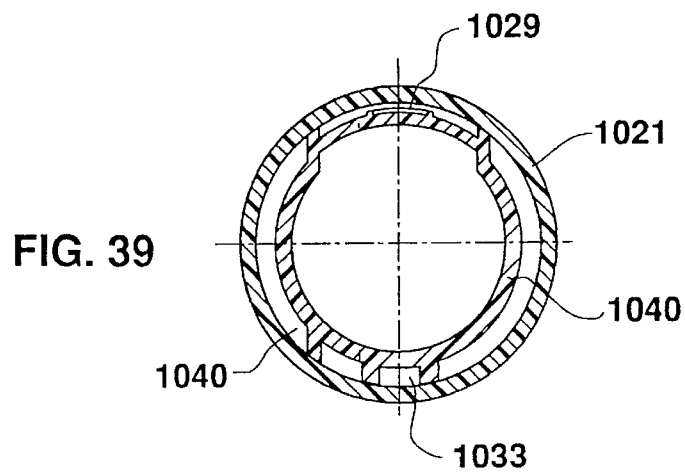
FIG. 39 is a transverse sectional view along line 39—39 of FIG. 38.
Figure 40:
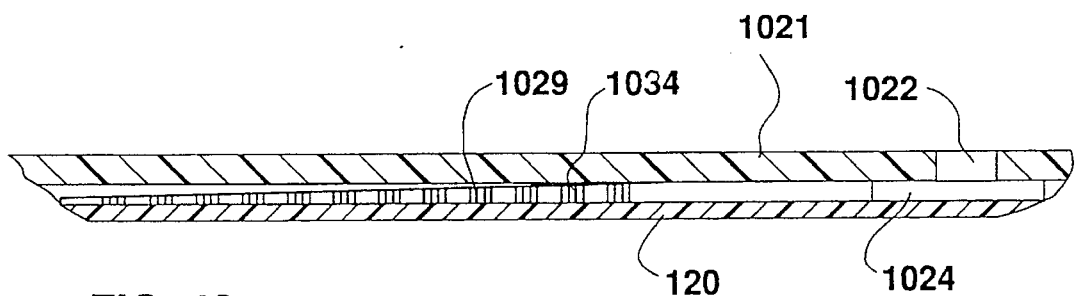
FIG. 40 is an enlarged fragmentary view of a part of the emitter of FIG. 38.
Figure 43:
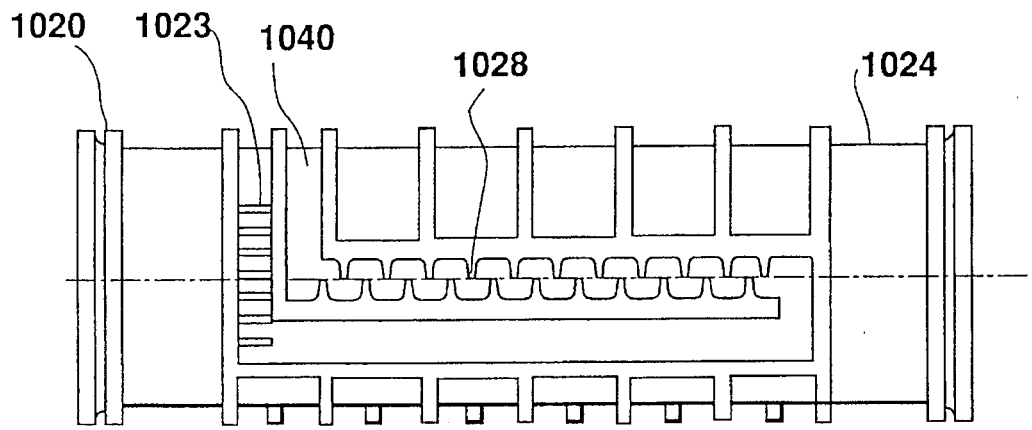
Figure 44:
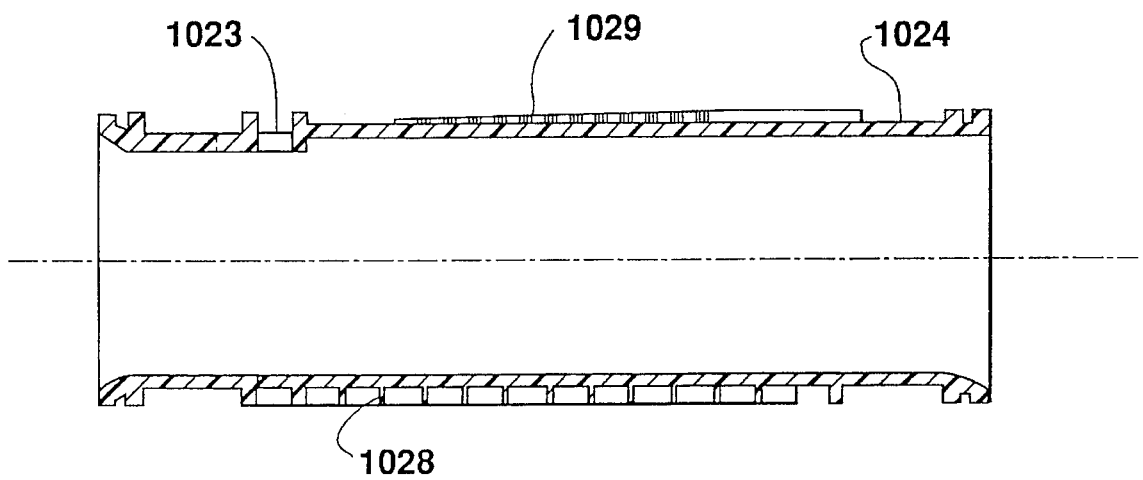
FIGS. 44 and 45 are longitudinal and transverse sectional views along section 44 and 45, respectively, of FIG. 42.
Figure 45:
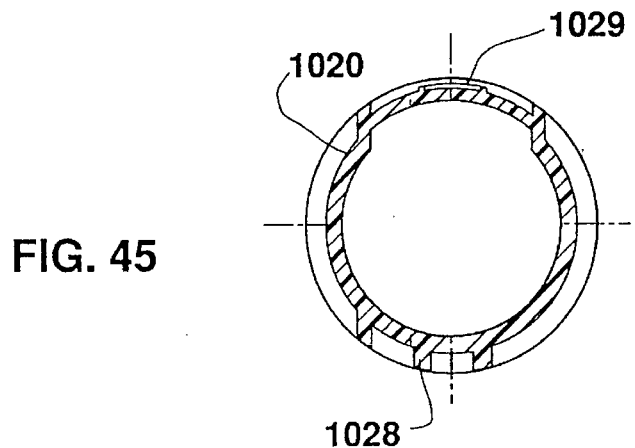

FIG. 33c illustrates the high-pressure condition of the control device, wherein a high inlet pressure has deformed membrane 904 so as to close substantially all the clearances between the membrane and baffles 939 of the regulating labyrinth 938, thereby introducing a high resistance to the flow of the fluid through the regulating labyrinth. A further increase in the pressure will tend to reduce the cross-sectional area of the inlet end 938a of the regulating labyrinth 938, as well as the cross-sectional area of that labyrinth.

It has been found that the flow control device illustrated in FIGS. 31–37 allows the flow rate to be preset as desired by merely manually rotating one housing part 902, 903 with respect to the other, to change the effective length of the non-regulating labyrinth 934 defined by baffles 936, while the regulating labyrinth 938 defined by baffles 939 better (as compared to the previously described arrangements) maintains the flow rate substantially constant at the preset rate even with variations in the line pressure. This is believed to be due to the following reason:

The membrane deforms in response to the difference in pressure on its opposite faces. In the earlier-described arrangements wherein the clearances progressively increase from the housing inlet end of the flow-control passageway to the housing outlet end, the pressure on one face of the membrane is of course the housing inlet pressure, but the pressure on the opposite face is always substantially atmospheric because of the large clearance between the membrane and the housing outlet. In the reverse-clearance arangement illustrated in FIGS. 31–37, however, the pressure on one face of the membrane is still the housing inlet pressure, but the pressure on the opposite face of the membrane varies with the flow through the control passageway, which in turn depends on the rate preset by the presettable passageway 934. Accordingly, the reverse-clearance arrangement illustrated in FIGS. 31–37 was found to be more effective in maintaining substantially constant the preset rate.

Another important advantage in the illustrated construction is that it also enables the flow control device to be used under relatively low pressure conditions. In addition, it enables the two labyrinths 934 and 938 to be constructed with relatively large passageways, thereby decreasing the sensitivity of the device to clogging. It also produces an efficient cleaning action, both at the beginning and at the end of the application of pressurized fluid, to clean the device of clogging particles.

The Device of FIGS. 38–45

The device of FIGS. 38–45 is similar to that of FIGS. 10–13, except that it includes the reverse clearance arrangement in the regulating labyrinth passageway described above with respect to FIGS. 31–37.

Thus, the flow regulator device 1020 insertable into the water supply tube 1021 is also an elastomeric cylinder formed with inlet openings 1023 communicating with the interior of the water supply tube, and an outlet chamber 1024 communicating with the outlet opening 1022 of the water supply tube. The outer surface of the elastomeric cylinder 1020 is also formed, as in FIGS. 10–13, with baffles 1028 adjacent to the inlet opening 1023 and baffles 1029 adjacent to the outlet opening 1024. Baffles 1028 are of equal thickness and extend across the complete space between the inner surface of the tube 1021 and the outer surface of the elastomeric cylinder 1020 to define, with the inner surface of tube 1021, the fixed-resistance labyrinth passageway 1033. Baffles 1029, however, decrease in thickness, and therefore produce clearances 1035 of increasing height to define the labyrinth passageway 1034 having a resistance to flow which varies with the inlet pressure by the sequential closing of the clearances 1035 with increasing pressure.

In the construction illustrated in FIGS. 10–13, the baffles (229) are configured to produce clearances (235) of increasing hight in the direction from the inlet opening to the outlet opening. In the construction illustrated in FIGS. 38–45 however, the baffles 1029 are configured to produce the reverse-clearance arrangement described above with respect to FIGS. 31–37, that is, the clearances 1035 are of increasing height in the direction from the outlet opening 1022 towards the inlet opening 1023. Also, whereas in FIGS. 10–13, the equal-thickness baffles 228 defining the non-regulating labyrinth passageway 233 are on the same side of the elastomeric cylinder as the baffles 228 defining the regulating labyrinth passageway 234, in the construction illustrated in FIGS. 38–45 the equal-thickness baffles 1028 are formed in the opposite side of the elastromeric cylinder 1020 and are connected thereto by a passageway 1040. Further, in the construction of FIGS. 38–45 the inlet to both labyrinth passageways are in the form of a plurality of slits 1023 extending through the elastomeric cylinder (FIGS. 42,43), which slits also act as filtering passageways blocking the entry of solid particles into the labyrinth passageways.

In all other respects, the device illustrated in FIGS. 38–45 is constructed and operates in the same manner as described above with respect to FIGS. 10–13.

The reverse-clearance arrangement illustrated in FIGS. 31–37 can of course also be used in the devices illustrated in FIGS. 1–9 and 14–30; such devices so constructed are therefore to be considered as expressly incorporated herein by reference.

While the invention has been described with respect to a number embodiments, it will be appreciated that these are set forth merely for purposes of example, and that many other variations may be made.

For example, the baffles illustrated in the devices of FIGS. 1–9 and 14–37 may be integrally formed in the elastormeic membrane (as they are formed in the elastomeric cylinder in FIGS. 10–13 and 38–45), rather than in the housing wall covered by the membrane. Also, while the invention is described above particularly with reference to drip irrigation emitters since this is an especially important application of these devices, it will be appreciated that the invention could also advantagedly be used in other applications requiring the controlled flow of a fluid. Many other variations, modifications and applications of the invention will be apparent.

I claim:

1. A fluid flow control device, comprising:
   a housing including an inlet connectible to a source of pressurized fluid, an outlet, and a flow control passageway connecting said inlet to said outlet;
   said flow control passageway including a plurality of baffles and a deformable elastomeric membrane defining therewith a labyrinth passageway having a plurality of clearances with respect to the baffles which said clearances are sequentially closed by the deformation of the elastomeric membrane with increasing pressure at the housing inlet to maintain a substantially uniform flow to and through the housing outlet in response to variations in the pressure of the water at the housing inlet;
   said clearances being sequentially closed in the direction from said housing outlet towards said housing inlet with said increasing pressure.

2. The device according to claim 1, wherein said baffles are integrally formed on a wall of said housing covered by said membrane.

3. The device according to claim 1, wherein said housing is attached to a tube connectible to said source of pressurized fluid, such that said housing inlet communicates with said pressurized fluid, and said housing outlet communicates with an outlet opening formed in said tube.

4. The device according to claim 1, wherein said housing includes:
   a first part formed with said housing inlet receivable in an opening in a tube;
   a second part formed with said housing outlet and attachable to said first part;
   one of said parts being formed with recesses defining said baffles between said first and second parts when attached together;
   said elastomeric membrane being interposed between one of said parts and said baffles and defining at least a part of said flow control passageway forming said clearances with respect to said baffles.

5. The device according to claim 1, wherein said housing further comprises;
   a presettable, fixed-rate, flow reducer in said flow control passageway between said housing inlet and said baffles for producing a predetermined fixed-rate of flow of the fluid;
   and manual presetting means for presetting the fixed-rate of flow of said flow reducer.

6. The device according to claim 5, wherein said fixed-rate flow reducer includes a second plurality of baffles defining a second labyrinth passageway, of fixed dimensions except for its length which said length may be preset by said manual presetting means.

7. The flow control device according to claim 6, wherein said manual presetting means comprises first and second relatively movable parts of the housing; said first housing part being formed with said housing inlet; said second housing part being formed with said second plurality of baffles such as to define, with said first housing part, said second labyrinth passageway whose length may be preset by moving said housing inlet in said first housing part with respect to said second plurality of baffles in said second housing part.

8. The flow control device according to claim 7, wherein said first housing part includes a cylindrical side wall and a transverse wall thereacross; and said second housing part includes a cylindrical side wall received within the cylindrical side wall of the first housing part, and a transverse wall aligned with said transverse wall of the first housing part;
   said second plurality of baffles being formed on the outer surface of the cylindrical side wall of the second housing part and defining said second labyrinth passageway with the cylindrical side wall of the first housing part;
   said first-mentioned plurality of baffles being formed on the surface of the transverse wall of the second housing part facing the transverse wall of the first housing part;
   said elastomeric membrane being clamped between said transverse walls of the first and second housing parts so as to define with said first-mentioned plurality of baffles said first-mentioned labyrinth passageway such that said first-mentioned labyrinth passageway has an inlet end communicating with said second labyrinth passageway and an outlet end communicating with said housing outlet.

9. A drip irrigation emitter, comprising:
   a cylindrical tube for conducting water through its interior and having an inner face facing its said interior;
   a plurality of cylindrical housings secured within the tube at longitudinally-spaced locations thereof; each of said cylindrical housings having an outer face facing the inner face of said tube, and an inner face facing the interior of said tube;
   and an elastomeric membrane secured on one face to a face of each cylindrical housing such as to define therewith a flow control passageway having an inlet communicating with the interior of the tube, and an outlet communicating with an outlet opening through the tube, the opposite face of the elastomeric membrane being subject to the water pressure within the tube whereby the membrane is deflected towards and away from said face of the cylindrical housing to vary the flow control passageway in response to variations in the water pressure within the tube;
   each of said elastomeric membranes being secured to the outer face of its respective cylindrical housing in spaced relation to the inner face of said tube to define said flow control passageway with said outer face of said cylindrical housing.

10. The emitter according to claim 9, wherein said cylindrical housing is formed with a plurality of narrow slits therethrough for conducting the water to said flow control passageway.

11. The emitter according to claim 9, wherein said flow control passageway includes a plurality of baffles formed on the outer face of the cylindrical housing and defining, with the inner face of the elastomeric membrane, a plurality of clearances which vary the resistance of the flow of the water through said flow control passageway in response to variations in the pressure of the water within the tube; said clearances being sequentially closed with increasing pressure at the housing inlet to maintain a substantially uniform flow to and through the housing outlet in response to variations in the pressure of the water within said tube.

12. The emitter according to claim 11, wherein said clearances are of increasing height in the direction from said housing inlet towards said housing outlet.

13. The emitter according to claim 11, wherein said clearances are of increasing height in the direction from said housing outlet towards said housing inlet.

14. A flow regulator device for insertion into a tube for a pressurized fluid having an outlet opening for discharging the fluid at a regulated rate via said flow regulator device; said flow regulator devise comprising:
   a cylinder of elastomeric material formed on its outer face with baffles to define, with the inner face of the tube, a labyrinth passageway having an inlet end communicating with the pressurized fluid in the tube, and an outlet end communicating with said outlet opening in the tube;
   said baffles being configured to define, with the inner face of the tube, a plurality of clearances of increasing height in the direction from one of said ends to the other of said ends such that the clearances are sequentially closed by the deformation of the elastomeric cylinder with increasing pressure within the tube to maintain a substantially uniform flow through said outlet opening of the tube in response to variations in the pressure of the pressurized fluid within the tube.

15. The device according to claim 14, wherein said baffles are configured such that said clearances defined thereby are of increasing height in the direction from the inlet end of the labyrinth passageway to the outlet end of the labyrinth passageway.

16. The device according to claim 14, wherein said baffles are configured such that said clearances defined thereby are of increasing height in the direction from the outlet end of the labyrinth passageway to the inlet end of the labyrinth passageway.

17. The device according to claim 14, wherein said elastomeric cylinder is further formed on its outer face with a second plurality of baffles defining, with the inner face of the tube, a second labyrinth passageway having an inlet end communicating with the pressurized fluid in the tube, and an outlet end communicating with the inlet end of said first-mentioned labyrinth passageway.

18. The device according to claim 17, wherein said second plurality of baffles are located on the same side of the elastomeric cylinder as said first-mentioned plurality of baffles.

19. The device according to claim 17, wherein said second plurality of baffles are located on the opposite side of the elastomeric cylinder as said first-mentioned plurality of baffles.

20. A drip irrigation emitter comprising a tube formed with a plurality of outlet openings along its length, and a flow regulator device according to claim 14 within the tube for each of said outlet openings.

21. A regulated flow restrictor device for assembly in a water conducting tube to be used as a drip irrigation emitter, comprising:

a cylindrical housing to be secured within said tube;

and an elastomeric membrane secured to a face of said cylindrical housing such as to define with said face a flow control passageway having an inlet to communicate with the interior of the tube, and an outlet to communicate with an outlet opening through the tube, with the opposite face of the elastomeric membrane subject to the water pressure within the tube such that the membrane is deflected towards and away from said face of the cylindrical housing to vary the flow control passageway in response to variations in the water pressure within the tube;

characterized in that said elastomeric membrane is secured to the outer face of said cylindrical housing to define said flow control passageway therewith.

22. The device according to claim 21, wherein said cylindrical housing is formed with a plurality of narrow slits therethrough for conducting the water to said flow control passageway.

23. The device according to claim 21, wherein said flow control passageway includes a plurality of baffles formed on the outer face of the cylindrical housing and defining, with the elastomeric membrane, a plurality of clearances which vary the resistance of the flow of the water through said passageway in response to variations in the pressure of the water within the tube; said clearances being sequentially closed with increasing pressure at the housing inlet to maintain a substantially uniform flow to and through the housing outlet in response to variations in the pressure of the water within said tube.

* * * * *